United States Patent [19]
Kan et al.

[11] Patent Number: 5,233,568
[45] Date of Patent: Aug. 3, 1993

[54] GEOPRESSURE ANALYSIS SYSTEM

[75] Inventors: Tze-Kong Kan, Plano; Sandy M. Zucker, Richardson; Matthew L. Greenberg, Dallas; William J. Lamb, Plano, all of Tex.

[73] Assignee: Atlantic Richfield Company, Los Angeles, Calif.

[21] Appl. No.: 845,305

[22] Filed: Mar. 3, 1992

Related U.S. Application Data

[62] Division of Ser. No. 723,491, Jun. 28, 1991, Pat. No. 5,130,949.

[51] Int. Cl.$^5$ .................. G01V 1/40; F21B 47/08; F21B 49/00; G01R 1/28
[52] U.S. Cl. .................. 367/27; 364/421; 364/422
[58] Field of Search .............. 367/27; 364/421, 422, 364/806; 181/105

[56] References Cited

U.S. PATENT DOCUMENTS

| | | | |
|---|---|---|---|
| 3,638,484 | 2/1972 | Tixier | 367/25 |
| 3,898,610 | 8/1975 | Pennebaker | 367/33 |
| 4,981,037 | 1/1991 | Halbrook et al. | 175/50 |
| 5,130,949 | 7/1992 | Kan et al. | 367/27 |

OTHER PUBLICATIONS

Kan et al, Jun. 6, 1990, Annual AAPG-SEPM-EMD-DPA Convention, Bull. 74, #5, pp. 690–691, May 1990, abstract only supplied.
Schlumberger, Log Interpretation Principles/Applications (1989) pp. 3–1 to 3–5 and 8–24 to 8–25.

*Primary Examiner*—Nelson Moskowitz
*Attorney, Agent, or Firm*—Carl H. Hoel

[57] ABSTRACT

Seismic data is combined with well log data to generate a two-dimensional geopressure prediction display; this permits deviated and horizontal well planning plus lithology detection. Shale fraction analysis, compaction trend, and seismic velocity may be automatically or interactively generated on a computer work station with graphics displays to avoid anomalous results. Corrections to velocity predictions by check shots or VSP, and translation of trend curves for laterally offset areas increases accuracy of the geopressure predictions. Multiple wells' logs in a basin permits analysis fluid migrations.

10 Claims, 21 Drawing Sheets

CONFIGURATION FOR A SONIC TOOL

S: TRANSMITTER 402
R1: RECEIVER 404
R2: RECEIVER 406

SHALE TRANSIT TIME DEVIATION vs. FLUID PRESSURE GRADIENT

FLUID PRESSURE GRADIENT (PSI/FT)

SHALE TRANSIT TIME DEPARTURE FROM NORMAL TREND ($\mu$SEC/FT)

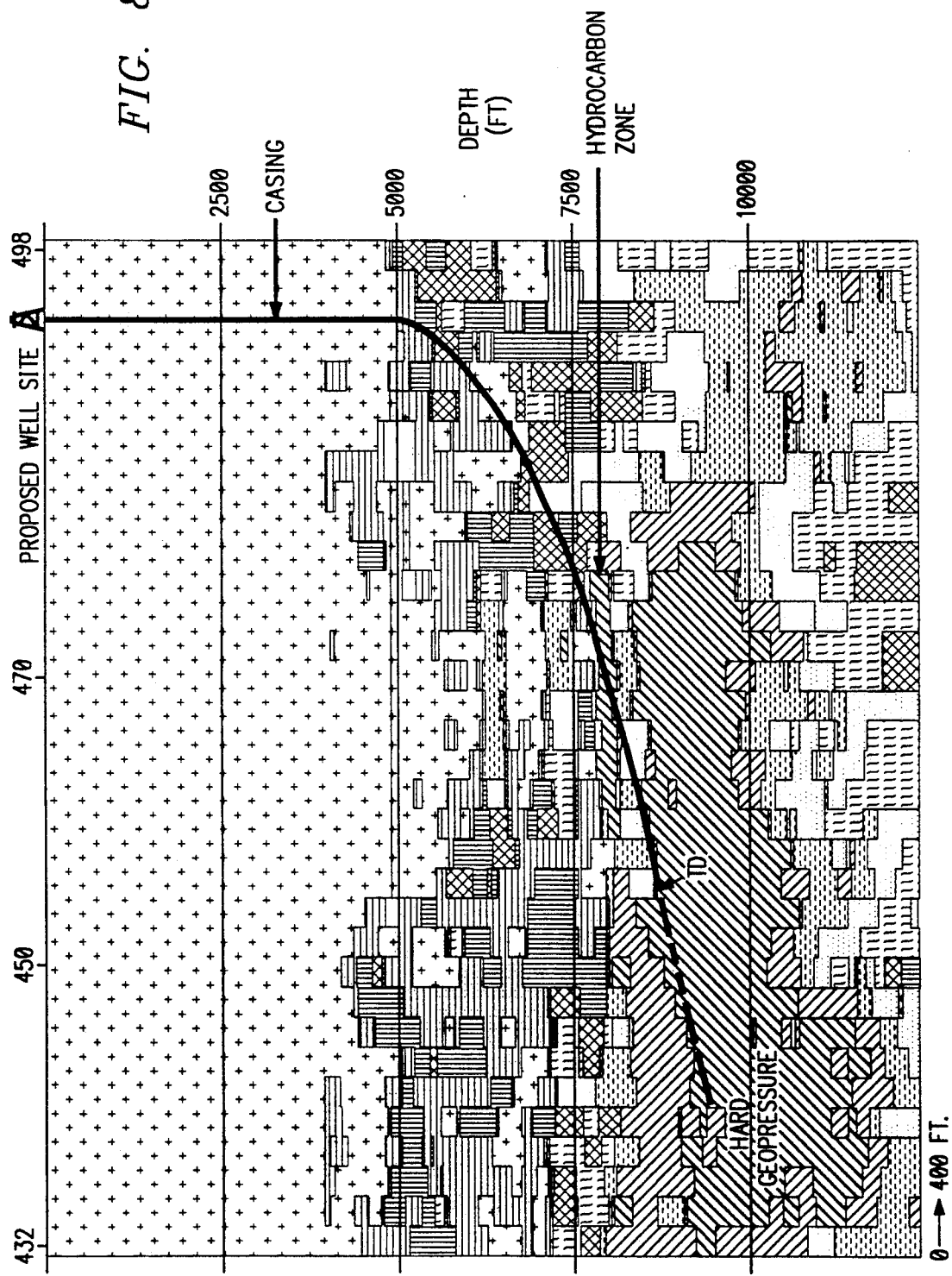

GEOPRESSURE ANALYSIS SYSTEM

This is a division of application Ser. No. 723,491, filed Jun. 28, 1991, now U.S. Pat. No. 5,130,949.

BACKGROUND AND SUMMARY OF THE INVENTIONS

This invention relates generally to determination of the depth of rock formations in the earth having abnormally high pressure (geopressure) conditions therein, and more particularly, to a method for predicting pressures in such formations prior to drilling of a borehole penetrating the formation.

In the process of forming sedimentary rocks, older sediments are buried deeper and deeper, with the overburden weight causing compaction. During compaction, porosity typically decreases, pore fluids are squeezed out, and remaining fluids maintain a hydrostatic pressure gradient with depth. However, if impermeable layers surround regions with pore fluids, entrapped fluids cannot escape and are subjected to above normal pressures (geopressure) within a formation.

During drilling of a borehole, drilling fluids, usually referred to as "muds," are circulated in the borehole to cool and lubricate the drill bit, flush cuttings from the bottom of the hole, carry cuttings to the surface, and balance formation pressures encountered by the borehole. It is desirable to keep rotary drilling mud weights as light as possible to most economically penetrate the earth; heavier muds may break down rocks penetrated by the borehole and thereby cause loss of mud. Mud weight is carefully monitored and may be increased during drilling operations to compensate for geopressure. In some areas, however, there may be unexpected abnormal increases in pressure, with depth such that mud weight does not compensate pressure; the result can be blowout of the well.

The reason that such geopressure conditions occur is that fluids become trapped in rock and must support some of the overburden weight. Also, there may be an earth formation of high porosity and high permeability, or a series of such formations, within a massive shale formation that is relatively impermeable so that fluid pressure is transmitted into such highly permeable formations (which usually are sands) as weight of overburden increases during sedimentation. When such formations are penetrated, the large pressure gradient into the borehole can easily result in a blowout.

It is desirable to set casing in a borehole immediately below top of a geopressured formation and then to increase mud weight for pressure control during further drilling. Setting a casing string which spans normal or low pressure formations permits the use of very heavy drilling muds without risking breaking down of borehole walls and subsequent lost mud. On the other hand, should substitution of heavy drilling mud be delayed until the drill bit has penetrated a permeable overpressurized formation (e.g., sandstone), it may be impossible to remove the drill string without producing a blowout or otherwise losing the well.

In areas where there is reason to suspect existence of such high pressure formations, various techniques have been followed in attempts to locate such geopressure zones. For example, acoustic or electric logs have been run repeatedly after short intervals of borehole have been drilled or are acquired using measurement-while-drilling techniques, and a plot of acoustic velocity or electrical resistance or conductivity as a function of depth has been made. Abnormal variations of acoustic velocity and/or electrical properties obtained by logging may indicate that the borehole has penetrated a zone of increasing formation pressure. It is manifest that such techniques are very expensive and time-consuming and cannot predict what pressures will be encountered ahead of the bit.

Furthermore, oil industry experience with drilling in the Gulf of Mexico indicates that almost 99% of commercial oil/gas fields are found in environments with only "mild" to "moderate" overpressures, and that regions of "hard" or high geopressure rarely contain commercial hydrocarbon accumulations. Therefore, predrill evaluation of the pressure regime of a prospective hydrocarbon target is critical to economic assessment of that target due to both low probability of economic hydrocarbon reserves in hard geopressure regions and increased total drilling costs in geopressure. Occurrence and timing of geopressure is closely related to sediment deformation and faulting and directly impacts migration of hydrocarbons.

U.S. Pat. No. 3,898,610 (Pennebaker) discloses methods of geopressure assessment in an area proposed for drilling: first, perform a seismic observation (using a common midpoint (CMP) method as illustrated in Pennebaker FIG. 1) to determine average seismic velocity as a function of depth; next, compute interval transmit time as a function of depth; and then compare these observed interval transit times to putatively normal interval transit times as illustrated in Pennebaker (FIG. 4). Depths where observed interval transit times are greater than normal indicate lower-than-normal velocity and inferentially greater-than-normal porosity and thus geopressured fluids. Putatively normal interval transit times are either (i) directly measured in a borehole in the general area which encountered only normal pressures during drilling or (ii) computed by following an expression for seismic velocity V (feet/second) as a function of depth D, with D measured in feet from a location of known seismic velocity $V_o$:

$$\text{Log}_{10}V(D) = \text{Log}_{10}V_o + KD;$$

where K is a constant equal to about 0.000029.

However, Pennebaker has problems with calibration of seismic velocity to well log and drilling information, quantifying computed pressure gradient from seismic transit time, pressure calibration dependence upon geological province and age, and being limited to vertical predictions.

The present invention provides predictions of two-dimensional pressure cross sections which provide for deviated well prediction, use translational curves for quantifying pressure gradient predictions, can be enhanced using vertical seismic profile (VSP) or check-shot information acquired during drilling (e.g., when data indicate that better calibration of seismic data is needed), and provide by the two-dimensional pressure cross sections visualization to understand structural and stratigraphic control of geopressure features and thus take advantage of geological information accumulated by explorationists in an area.

BRIEF DESCRIPTION OF THE DRAWINGS

The present invention will be described with reference to the accompanying drawings which are schematic for clarity.

FIG. 8 is a two-dimensional pressure prediction display;

FIGS. 11a-e show check shot correction of velocity and pressure predictions;

DESCRIPTION OF THE PREFERRED EMBODIMENTS

Figure 1:
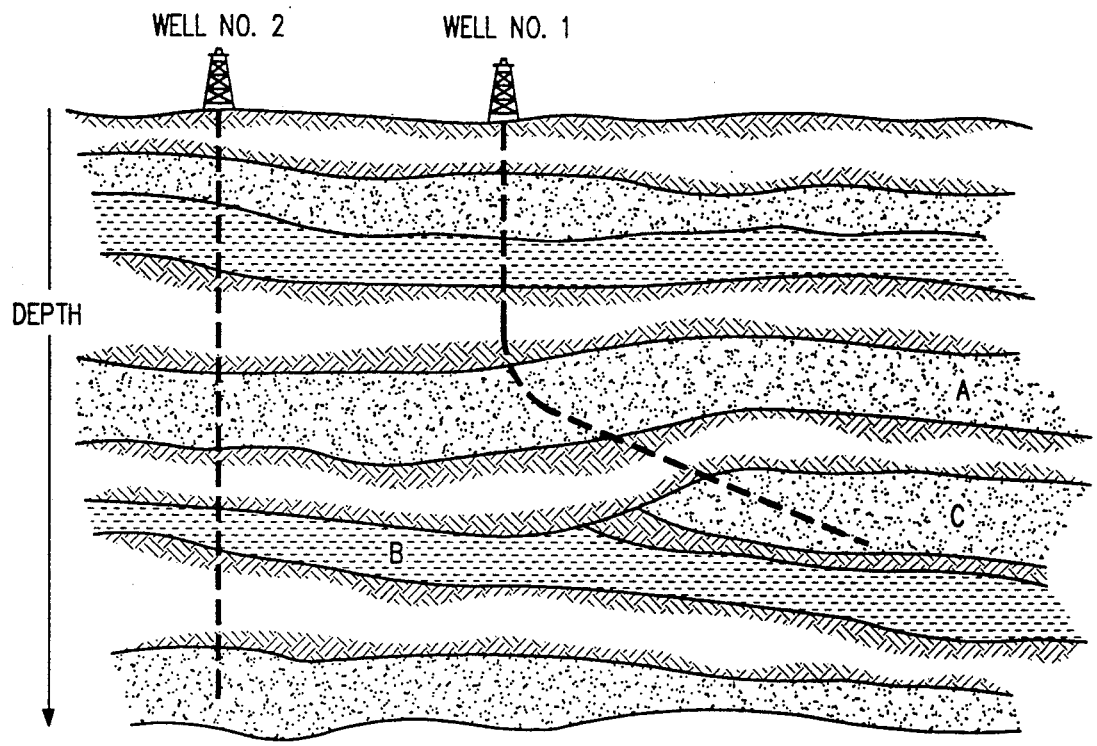
FIG. 1 is an exemplary cross sectional elevation view of subsurface formations.

The first preferred embodiment will be described in connection with the simplified example of FIG. 1. FIG. 1 illustrates, in cross sectional elevation view, sand and shale subsurface layers. Dotted layers indicate sand, cross hatched layers indicate shale, and dots plus cross hatching indicate dirty sand (sand mixed with invasive shale) layers. The case of other materials also present will be discussed later. Note that layers could represent subsea formations in the case of offshore wells. Effects of compaction and associated diagenesis of shales and sands differ considerably. As porosity decreases, compacted shale become impermeable, whereas sands can maintain a relatively high permeability even under great pressure. Geopressured fluids can be trapped within compacted shales and also within any sands which are completely enclosed by the geopressured shales; recoverable hydrocarbon fluids reside primarily within sands. In the example of FIG. 1, hydrostatic fluid pressure prevails down to sandy layer A, which is covered by a shale layer. Layer A has mild geopressure. Zone C could hold recoverable hydrocarbons and have moderate geopressure due to impermeability of the overlying shale layer; and dirty sand layer B could have hard geopressure. If the information of FIG. 1 were available, then a well drilling program may be designed to penetrate layer A and zone C as possible hydrocarbon reservoirs and to avoid hard-geopressured regions such as layer B, which rarely contain economically valuable fluids but do present blowout risk. Thus a deviated drilling as indicated by well no. 1 would be preferable to well no. 2.

In order to be able to prescribe drilling programs such as the deviated well no. 1 in FIG. 1, one must have geopressure information from the entire area, such as provided by the first preferred embodiment method of geopressure assessment, and not just information along one or a few proposed vertical drilling sites.

Figure 2:
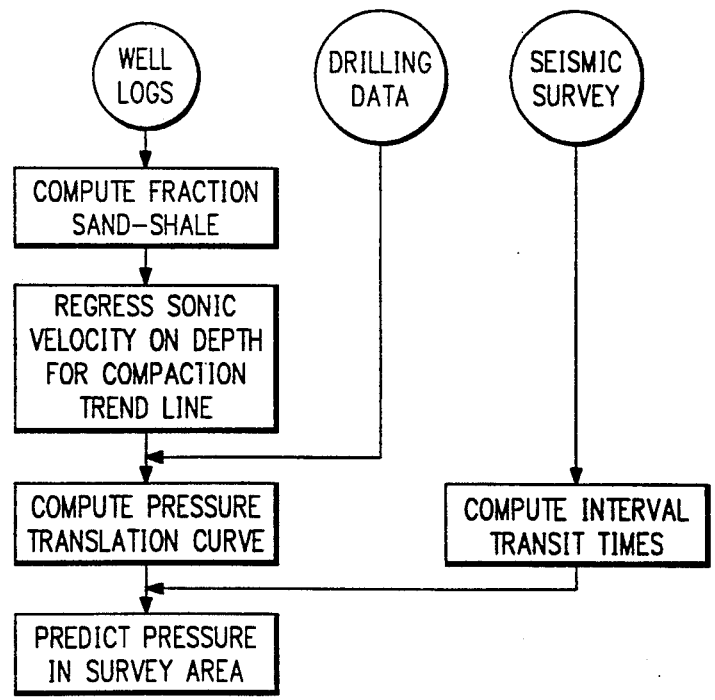
FIG. 2 is a flow chart for the first preferred embodiment method.
Figure 3B:
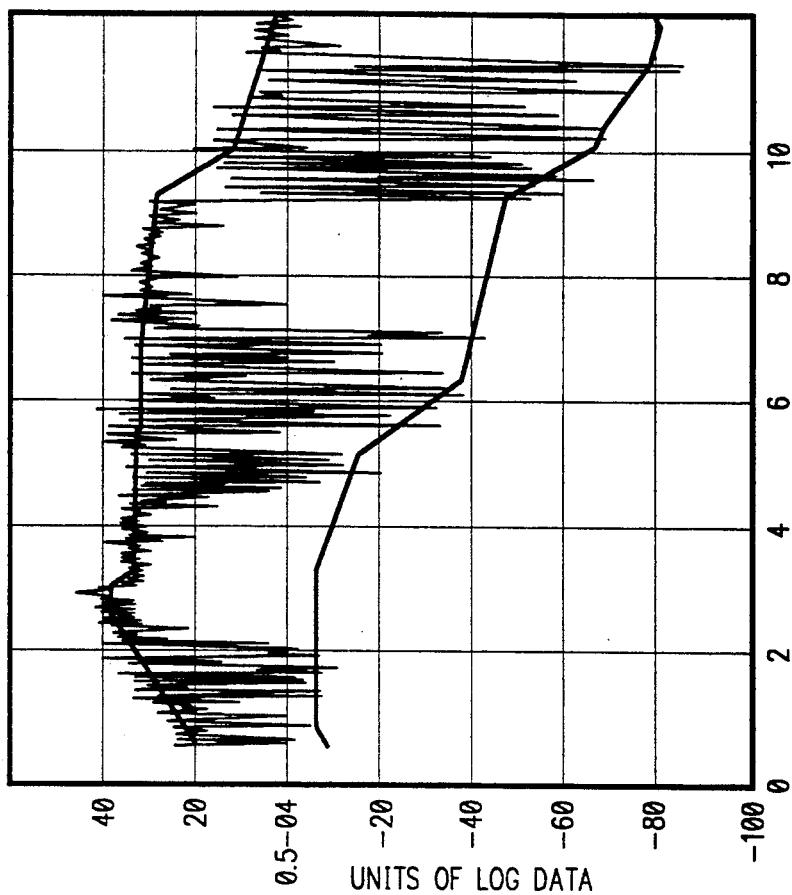
FIGS. 3a-c show sand/shale analysis.
Figure 3A:
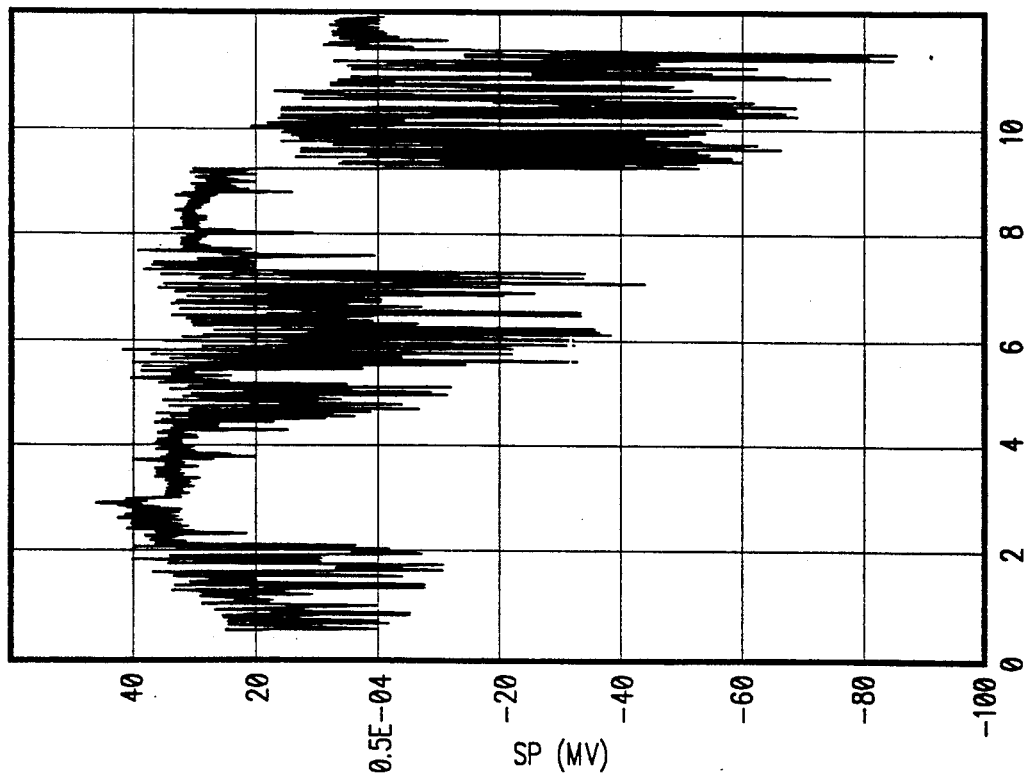
Figure 3C:
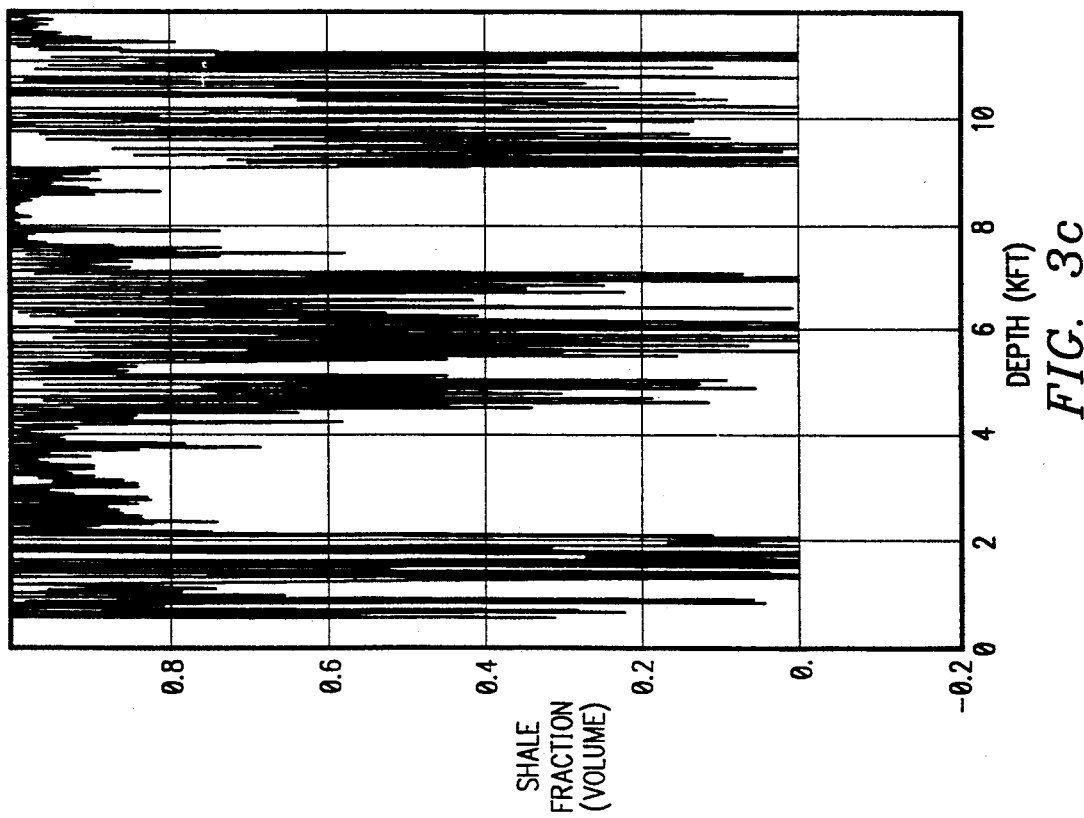

FIG. 2 is a flow diagram for a first preferred embodiment method of assessing geopressure of subsurface earth formations in an area and includes the following steps:

(a) Compute volume fraction of shale as a function of depth by interpreting spontaneous potential or gamma radiation log data from an existing borehole in the area of interest. Well no. 2 of FIG. 1 could be the preexisting borehole and may be a mile away from the center of the area of interest. Gamma radiation from shale usually exceeds that of sand due to presence of naturally occurring radioactive isotopes of potassium and thorium that have a much higher concentration in shale than in sand. The spontaneous potential log, measured in millivolts as a function of depth, increases in magnitude in shale and decreases in sand due to electrical current flow induced by drilling through sand-shale interfaces which posses membrane potential. FIG. 3a illustrates typical raw data from a spontaneous potential log acquired in a Gulf of Mexico well. Various methods exist to pick out a shale baseline (where points of "pure" shale would lie) and a sand baseline (where points of "pure" sand would lie) for raw data, including expert interpreters judging by eye the appropriate baselines. A preferred embodiment baseline picking method, as generates baseline curves shown as broken lines in FIG. 3b. Then, scaling data to baseline curves normalizes the data as shown in FIG. 3c. The baseline picking method is essentially automated with parameters relating to data handling; thus shale fraction can be easily derived with interactive parameter adjustment for anomalous cases. This may be done on a computer work station with graphic display.

Figure 4:
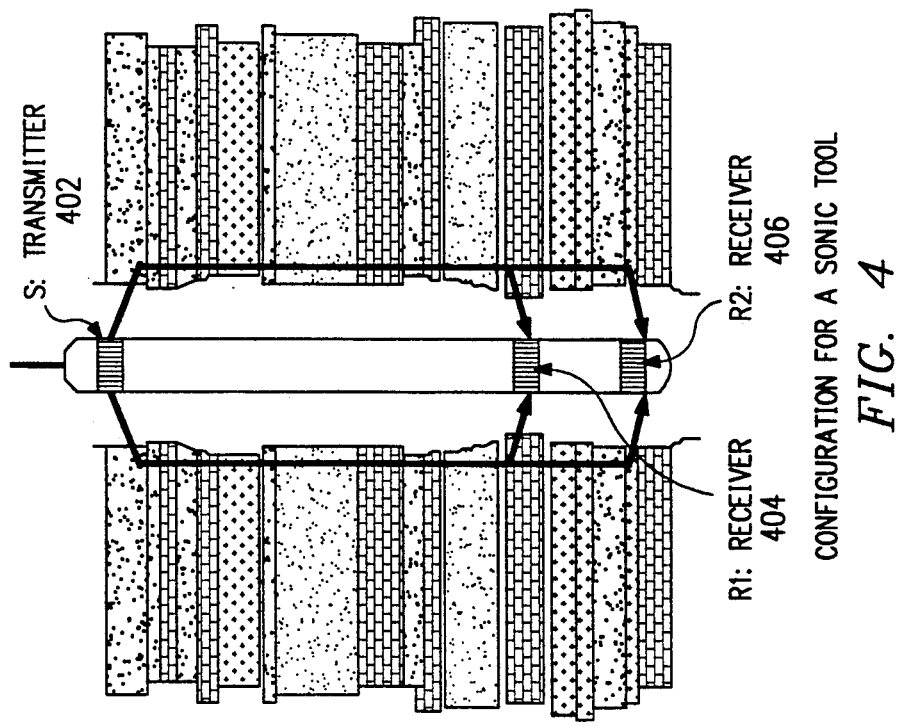
FIG. 4 illustrates a sonic velocity logging tool.

(b) From the FIG. 3c data locate intervals of 10-foot vertical thickness wherein shale composition is at least 90% ("pure shale") and obtain sonic velocity compressional wave transit time by data ($\Delta t$) in the existing borehole for each pure shale interval. Sonic logging typically uses a sonic logging tool with a transmitter and two receivers; see FIG. 4. Receivers are spaced about two feet apart, so a pulse emitted by transmitter 402 will be received a time $2\Delta t$ seconds later by receiver 406 than by receiver 404; $\Delta t$ is compressional wave transit time for a one foot interval and equals $1/v$ where v is average sonic velocity (in feet per second) for the two feet of rock between receivers 404 and 406. Such in situ sonic velocity measurements agree with laboratory velocity measurements generally, although borehole alteration, attenuation, and other phenomena produce errors in velocity and necessitate velocity corrections to match seismic. Velocity data will be used in the $\Delta t$ raw data form and expressed in terms of microseconds per foot.

(c) From the data of step (b), plot the logarithm of $\Delta t$ as a function of depth for all pure shale intervals. This plot typically yields a scatter as in FIG. 5a. The underlying idea of what follows is: if sedimentary shales arose from uniformly deposited clays which permitted fluids to escape as porosity decreased (hydrostatic zone), then overburden weight would increase linearly with depth and shale compaction would increase observed sonic velocity exponentially with depth (very roughly doubling velocity in 10,000 feet). Thus a normal compaction (hydrostatic zone) trend line, if working on the data points of FIG. 5a, would be a straight line and data which deviates from the trend line to lower velocities would indicate less-than-normal compaction such as due to geopressured fluids. A similar plot using points of "pure sand" would not be as effective because undercompacted shales are the main cause of geopressure. 75% or more of sedimentary rocks are composed of shale. It is important to analyze compaction status of shale and not of sand.

Figure 5D:
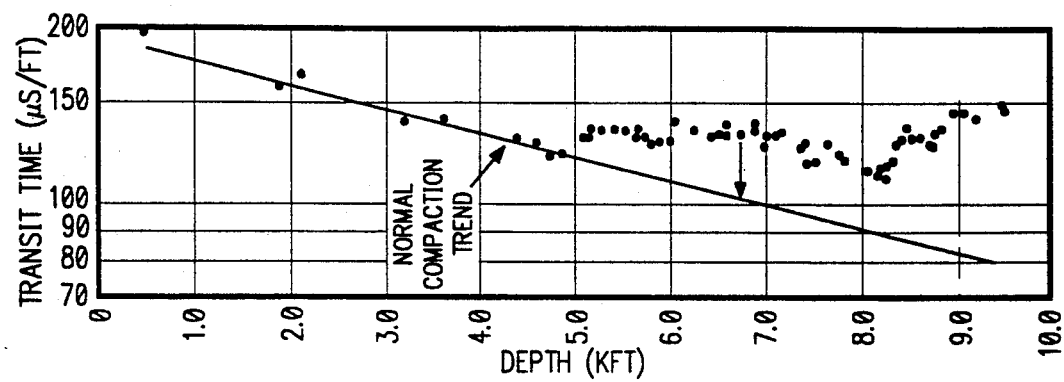
FIGS. 5a-d show sonic velocity trend line data.
Figure 5C:
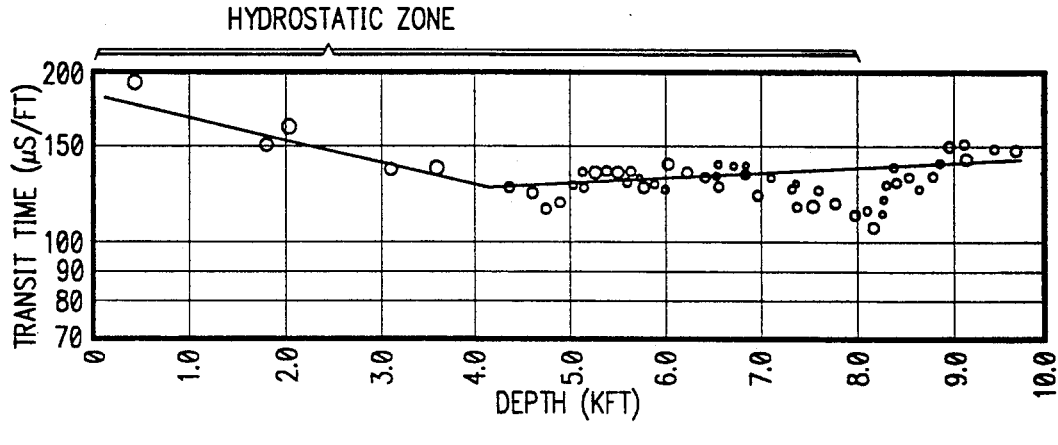
Figure 5B:
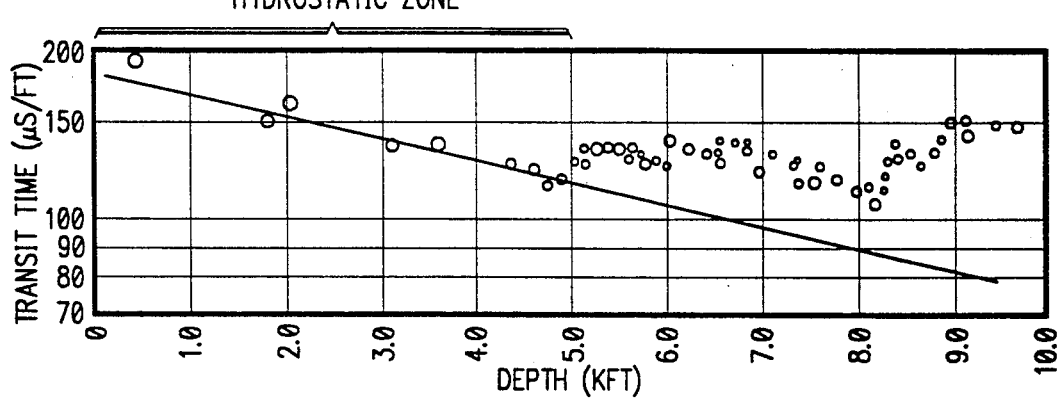

(d) Determine a least squares best fit line to points plotted in step (c) under the condition that only hydrostatic zone data points are used; this line will be taken as the normal compaction trend for the area. Because the hydrostatic zone will extend from surface (excluding a low velocity surface layer), selection of data points to use for the fit may be a simple visual determination of a cutoff depth with all data points having greater depth excluded. See FIG. 5b showing the fitted line. Determination of a cutoff depth may be done interactively on a computer work station with a display of the fitted line for the hydrostatic zone data selected. Alternatively, various statistical methods could be applied. Indeed, data points often can be fitted with more than one line within the hydrostatic portion where there are differences in rock characteristics, so a piecewise linear fit may apply as illustrated in FIG. 5c.

Figure 5A:
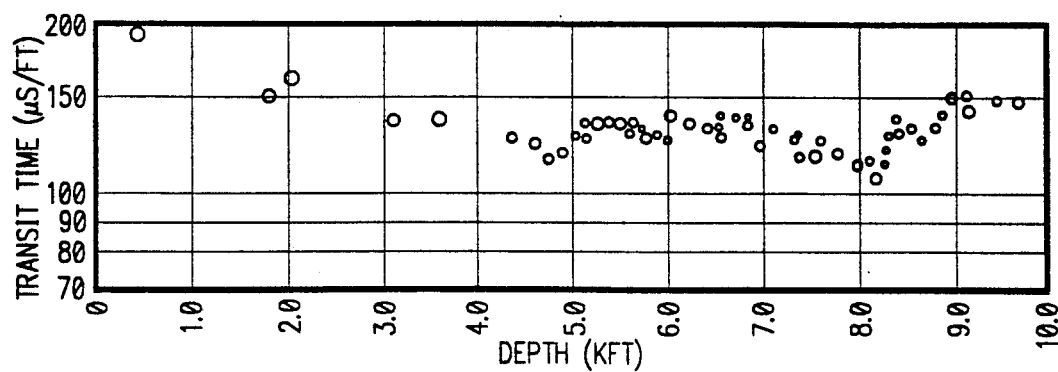
Figure 6A:
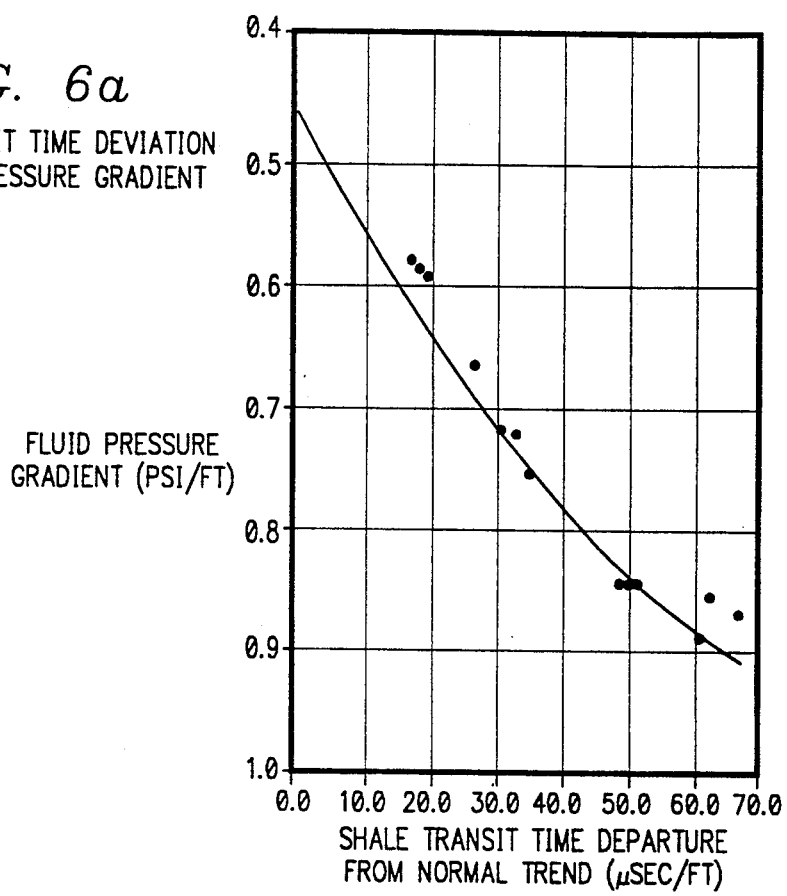
FIGS. 6a-b illustrate translation curves.

(e) Create a pressure translation curve, treating pore pressure gradient (as measured by mud weight actually used during drilling of the existing borehole) as a dependent function of interval transit time deviation, by plotting, for each data point of FIG. 5a which was excluded from the compaction trend line fit (FIG. 5b), a point with an x coordinate equal to departure of interval transit time from the compaction trend line and a y coordinate equal to mud weight (in units of pressure) used at depth where interval transit time data was acquired. FIG. 5d shows used data points and indicates interval transit time departure. Mud weight values, being usually sparsely sampled, are interpolated to these equivalent depths. FIG. 6a illustrates these datapoints and a resultant translation curve; note that the hydrostatic pressure gradient for water equals about 0.465 psi/ft, and this determines intercept of the pressure translation curve with the y axis. Mud weight may not accurately measure pore pressure gradient because mud weight typically exceeds pore pressure gradient so as to provide a safety margin, but mud weight generally is the only calibrating pressure measurement available. RFT (Repeat Formation Test) log or drill stem test data, when available, provide preferable pore pressure gradient data for creation of a pressure translation curve. Information in a pressure translation curve such as FIG. 6a may be summarized by fitting a polynominal and thus reduce the curve to two or more coefficients. In particular, pore pressure gradient, PPG, may expressed in terms of transit time departure from the compaction trend line, $\delta \Delta t$, as $$PPG = 0.465 + C_1(\delta \Delta t) + C_2(\delta \Delta t)^2 \ldots$$

Figure 6B:
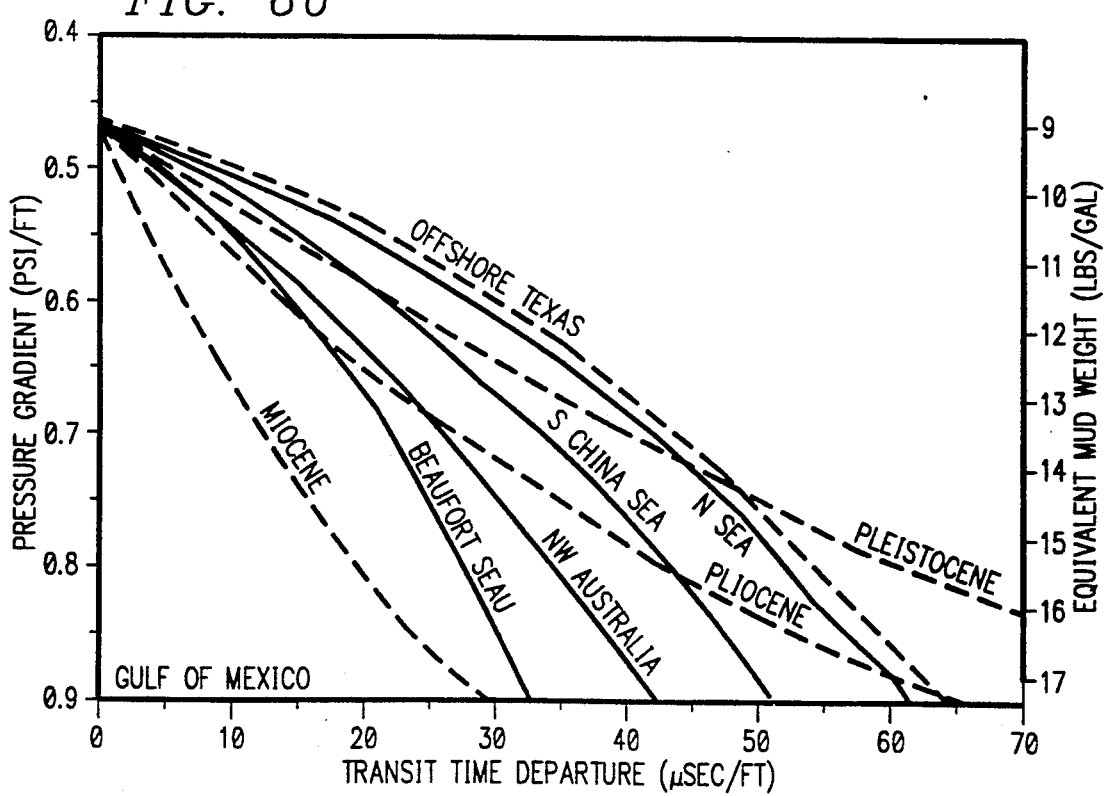

Coefficient $C_1$ will usually be roughly from 0.002 to 0.02 if interval transit time departure is measured in microseconds per foot and pore pressure gradient is measured in pounds per square inch per foot; $C_2$ may be positive or negative. FIG. 6b illustrates the variety of translation curves obtained.

The pressure translation curve represents data available from the existing borehole and will be used to translate seismic data gathered in the area of interest into pore pressure predictions.

Pore pressure gradient as a function of interval transit time departure, as shown in FIG. 6a, strictly only applies to pure shale because this constituted the input data. Thus a gas-filled sand with high porosity may have a very low sonic velocity and thus give a large interval transit time departure without having hard geopressure. Verification of how well this derived pressure translational trend may be used for other wells in the vicinity is accomplished by performing steps (a) through (d) on a second well, applying this pressure translational trend and then comparing resulting pressure data to observed mud weight measurements in this second well.

Figure 7A:
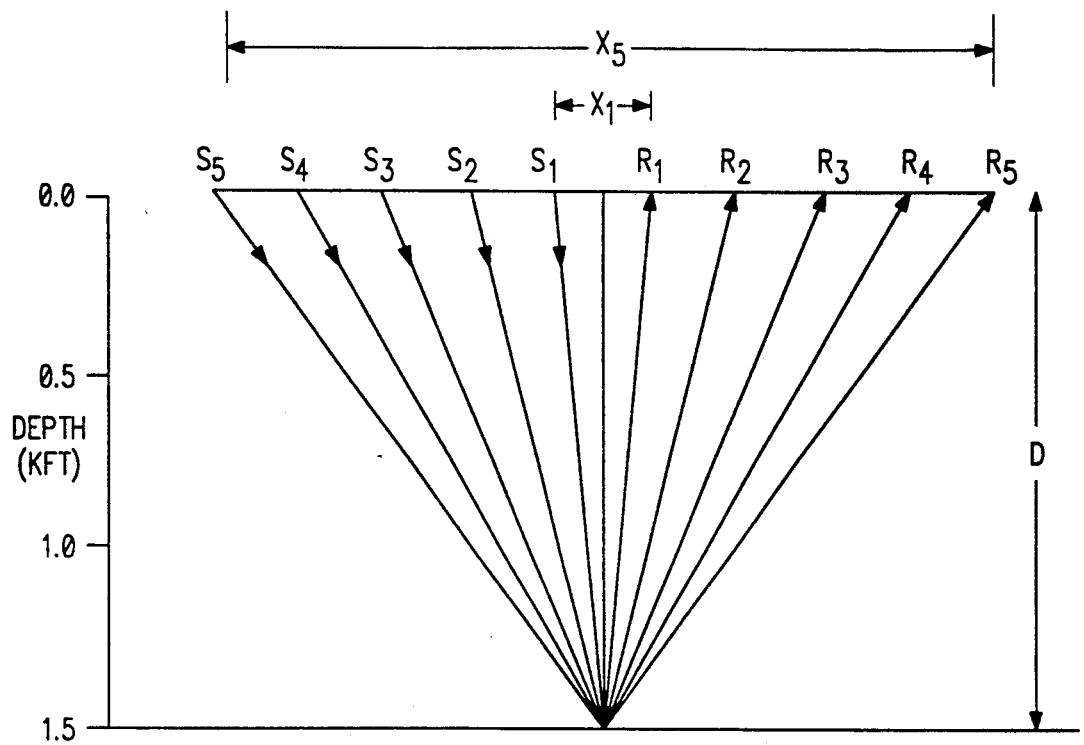
FIGS. 7a-d show seismic analysis.
Figure 7B:
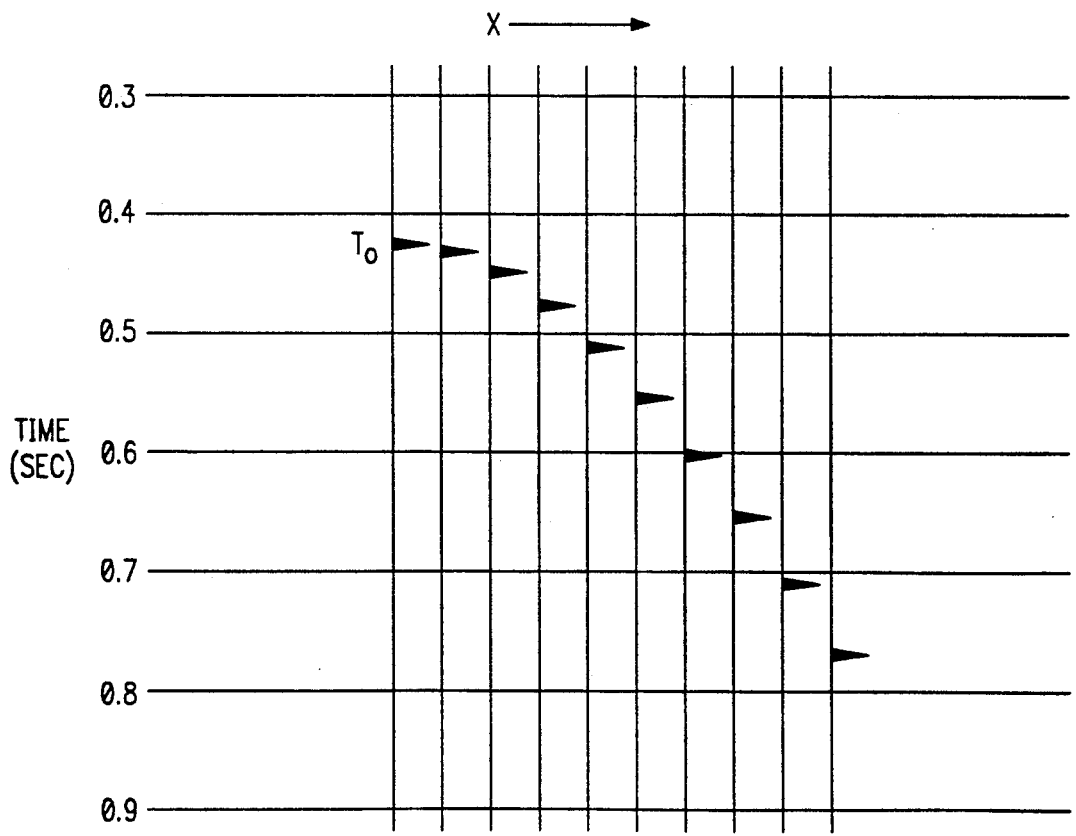

(f) Perform a seismic survey in area of interest so as to determine velocity as a function of depth for a line or a grid of surface locations with separations of about a few hundred feet. Acquisition, processing and interpretation of reflection seismic data follows well known methods. Briefly, the Common Midpoint (CMP) method at each line or grid point provides multiple measurement of distance from seismic surface source to surface receiver and wave reflection time for any given subsurface reflecting interface or "reflector"; see FIG. 7a. Seismic response to a given reflector in a CMP gather can be approximated by a hyperbola: the square of transit time from source to receiver depends upon the square of distance between source and receiver divided by the square of a velocity (the stacking velocity); see FIG. 7b.

Figure 7C:
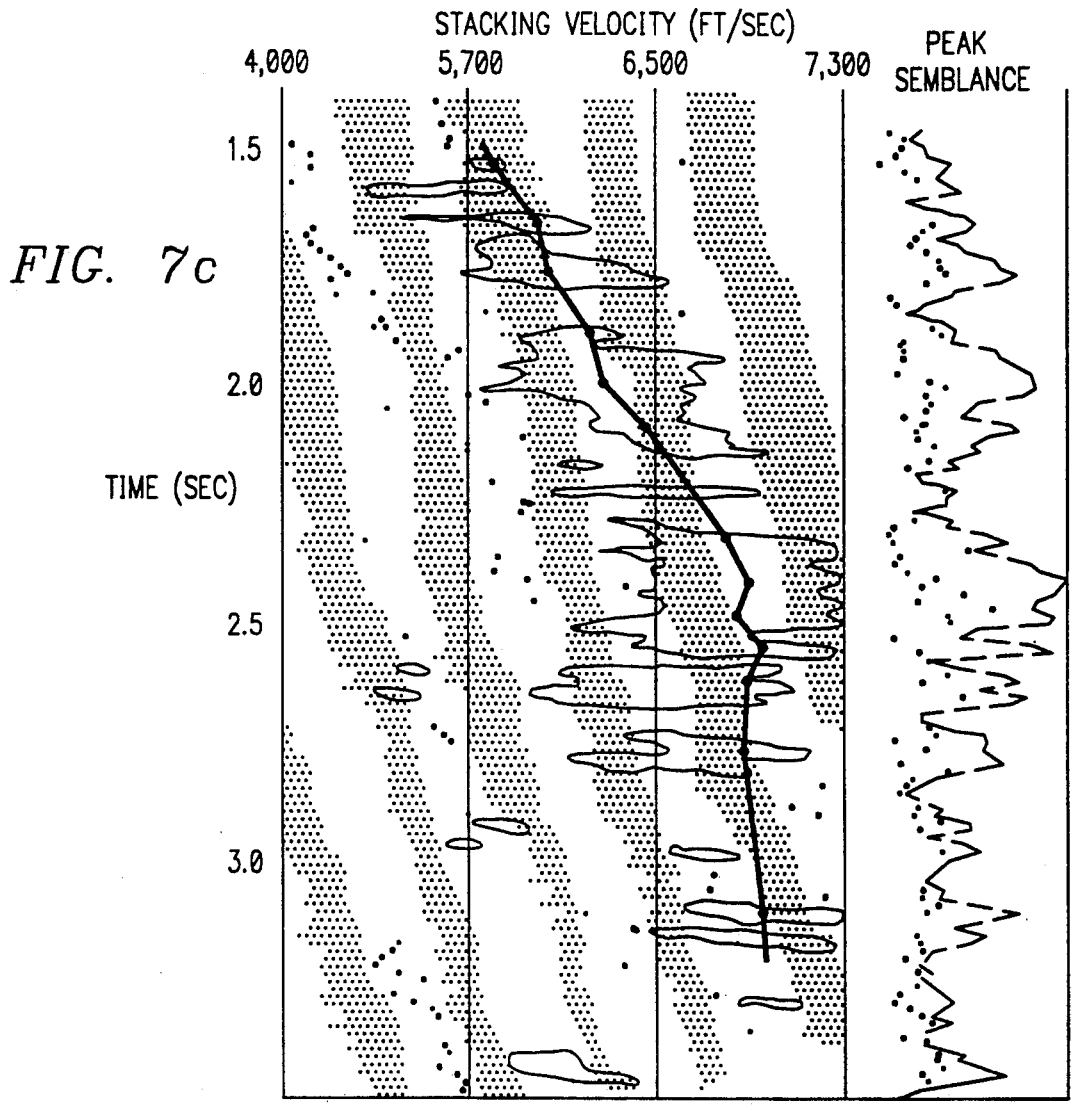
Figure 7D:
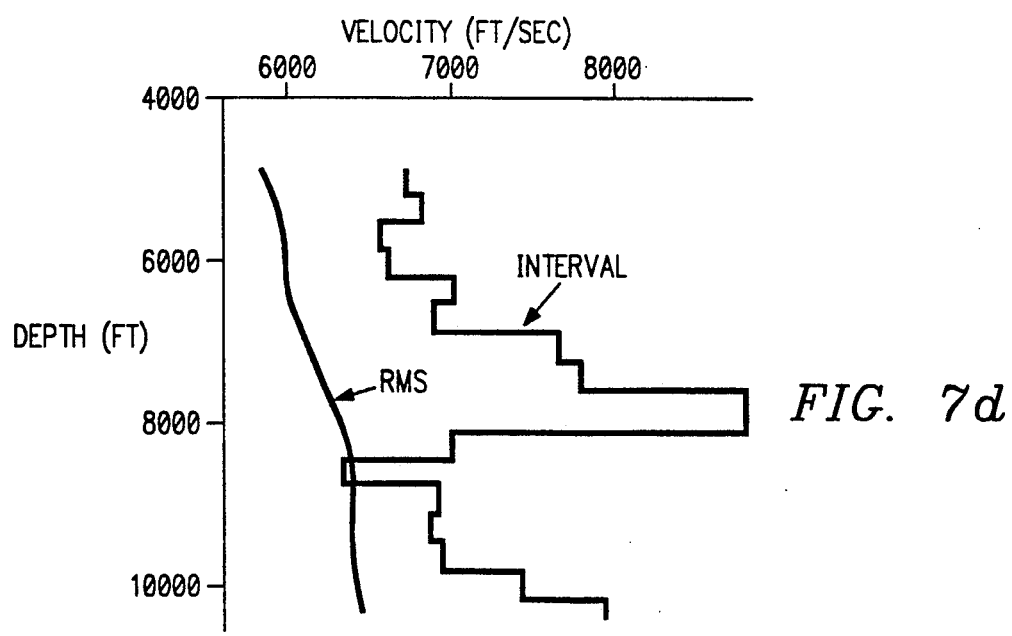

Computing coherency among a suite of hyperbolae as a function of stacking velocity and reflection time provides a semblance spectrum of the CMP data. Picking peaks in the semblance spectrum leads to a stacking velocity function (see exemplary FIG. 7c), and thus to interval transit times as a function of depth (see exemplary FIG. 7d). This could be automated by just connecting the largest peaks with straight line segments; however, various problems occur with processing and interpretation of seismic data, such as multiple reflections, converted waves which travel at different velocities, attenuation, dipping reflectors, frequency-dependent velocities, coherent noise, diffractions, faults, sideswipe, lateral velocity anomalies, and lack of reflections. Thus, generally, picking velocities from semblance data requires recognition and avoidance of anomalies that may trouble an automatic picker and knowing when data becomes very poor at great depths.

The preferred embodiment provides interactive velocity picking which allows iterative picking of peaks that are graphically displayed on a computer work station for easy visualization of the velocity and interval transit time curves. Use of only every second CMP after lateral smoothing lessens velocity determination processing time. Seismic data yields interval transit times as a function of depth at each of the line or grid points in the area of interest.

(g) For each line or series of grid points, compute interval transit time departure from the compaction trend line derived in step (d). Then use the pressure translation curve of step (e) to convert interval transit time departures into pore pressure gradients. This quantifies geopressure to provide mud weight predictions and locations of hard geopressure which are to be avoided. Results can then be displayed in any convenient manner; FIG. 8 shows a cross sectional elevation view (analogous to FIG. 1) with pore pressure gradient indicated by color.

Interpretation of particular features in the results are part of the overall method in that interpretations can arise from the method's handling of input data. For example, gas in porous sand may be at hydrostatic pressures but still greatly lower observed sonic velocity; consequently, such gas sand zones will translate to high pore pressure gradient zones. The diagnostic for presence of such gas sand may be that shale surrounding the sand is more compacted than other shale at the same depth and thus would have above-trend velocities. Such a differential compaction phenomenon could be used to detect gas-filled sand in geopressured zones using sonic data; this would represent a novel method for visualizing gas-filled sands, i.e., a new type of "gas-indicator" plot.

Figure 9:
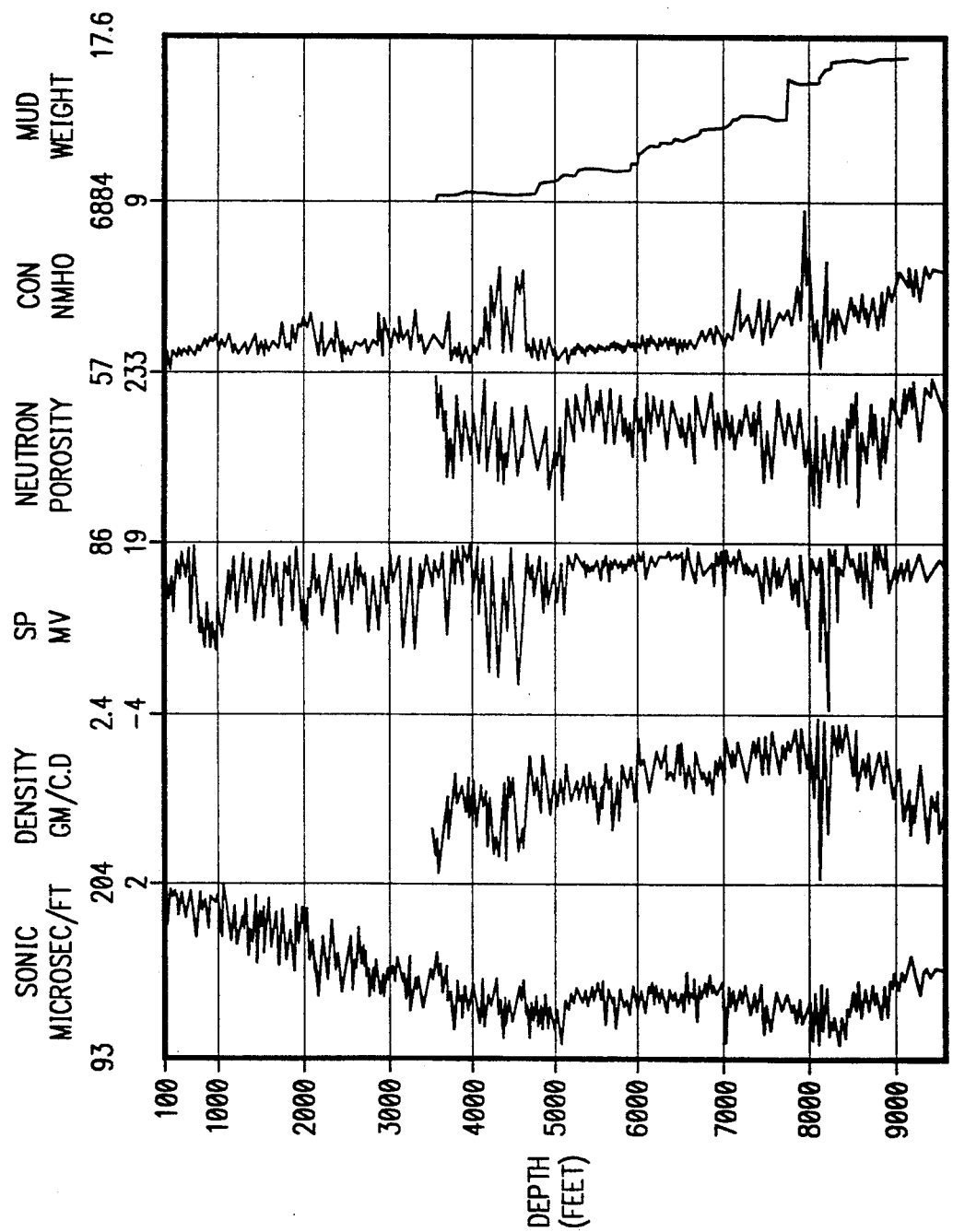
FIG. 9 shows borehole well log data.

A second preferred embodiment method follows procedures of the first preferred embodiment method but includes more analyses of subsurface rock based on log data from the existing borehole; this permits the second preferred embodiment method to apply to lithologies more complicated than sand/shale layers. In particular, the second preferred embodiment method adds further data gathering to step (a) in that borehole data (if available) for rock mass density, porosity (e.g., from neutron slowing-down length log data), rock electrical conductivity and rock photoelectric absorption cross section to also distinguish carbonate and evaporite rocks and to determine shale volume fraction. FIG. 9 shows exemplary log data. Once composition is determined, the second preferred embodiment follows steps (b)-(g) of the first preferred embodiment. Sonic velocity in carbonates and salts can greatly exceed that in sands and shales and also can increase faster as a function of depth. Thus identification of composition is crucial.

Figure 10:
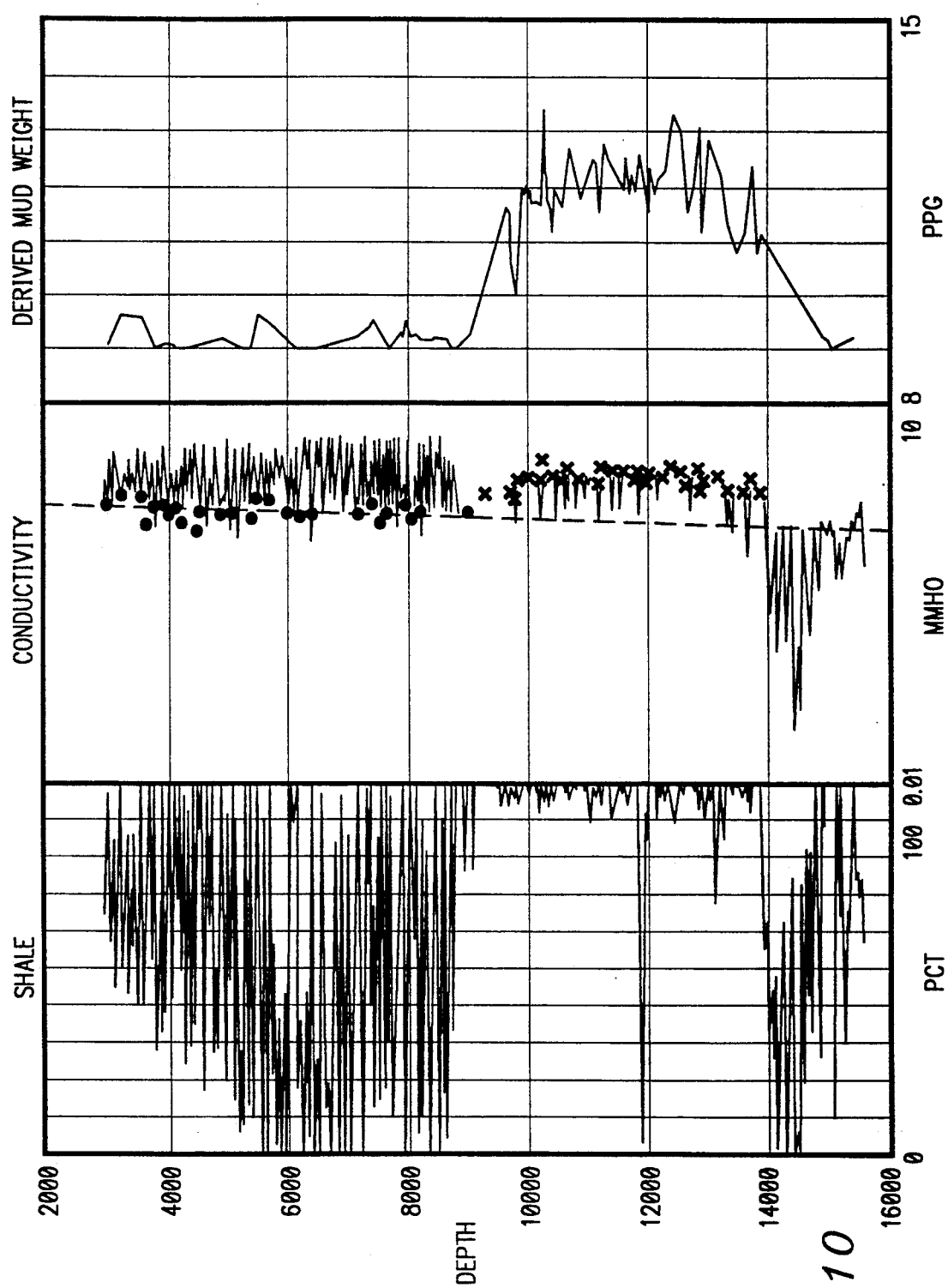
FIG. 10 shows pressure calibration using a resistivity log.

In the case of a preexisting borehole without a sonic log, steps (a)-(e) can be performed and pressure calibration can still be established; see FIG. 10 which shows use of electrical conductivity data instead of sonic data. In particular, the lefthand portion of FIG. 10 shows shale fraction, the middle portion indicates conductivity (logarithmic) trend line fit to the hydrostatic portion of the data, and the righthand portion shows the derived pressure prediction. Using normal compaction trend lines in terms of the new data units of measurement and pressure translational curves for these data, pressure data at a central well location can be derived from these additional sources of data. Since units are different, this information cannot be directly applied to seismic data unless another nearby well is available wherein a correlation between electrical conductivity and compression wave velocity can be established; correlation would then permit translation of conductivity units to velocity units, the latter usable for seismic processing. When density data is used instead of sonic data, a normal compaction trend line can be derived, and top depth of any geopressured zone can be located during drilling. These additional data also allow assessment of changes in lithology so that piecewise linear trend lines for a sonic log as in FIG. 5c can be confidently used.

The third preferred embodiment follows steps of the first or second preferred embodiment methods plus includes vertical seismic profile (VSP) data obtained during drilling at the selected site for real time adjustments to the pore pressure gradient prediction. In more detail, presume that the first preferred embodiment methods has been used to map pore pressure gradient in an area and a well site has been selected in this area for drilling. Then, during well drilling at the selected site, a sonic receiver is placed in the well and a sonic wave generator situated on the surface (or vice versa) near the partially-drilled well. A series of shots from the wave generator are recorded with the receiver placed at different depths for each shot, typically at 50 foot intervals; these are direct waves as opposed to reflected waves as recorded by surface receivers in step (f) of the first and second preferred embodiments. This creates reasonably accurate interval transit time data down to current well bottom.

VSP measurements may deviate from velocity as measured by a sonic tool (FIG. 4) because VSP velocity is an average over an interval of 50 feet while the sonic tool is an average over about two feet, and the VSP velocity is measured at the seismic frequencies of 10 to 100 Hz while the sonic tool operates at frequencies of 10 to 20 KHz as well as for reasons of differences in sample volumes. To the extent that rock properties vary over the receiver spacing interval and/or vary on average between sample volumes measured with VSP and sample loss, and to the extent that velocity is frequency dependent, VSP velocity will deviate from sonic tool velocity. The VSP has larger receiver spacing and operates at lower frequency than the sonic tool. VSP velocities have greater depth resolution than sonic tool velocities; however, VSP data are not usually affected by drilling effects which can plague sonic data. As the VSP uses a downhole tool for which depth has been directly measured and as the VSP measures propagation time one way through the rocks, velocities from VSP are more accurate than velocities from surface seismic for depth intervals of the well spanned by VSP receiver data acquisition depths.

Figure 11A:
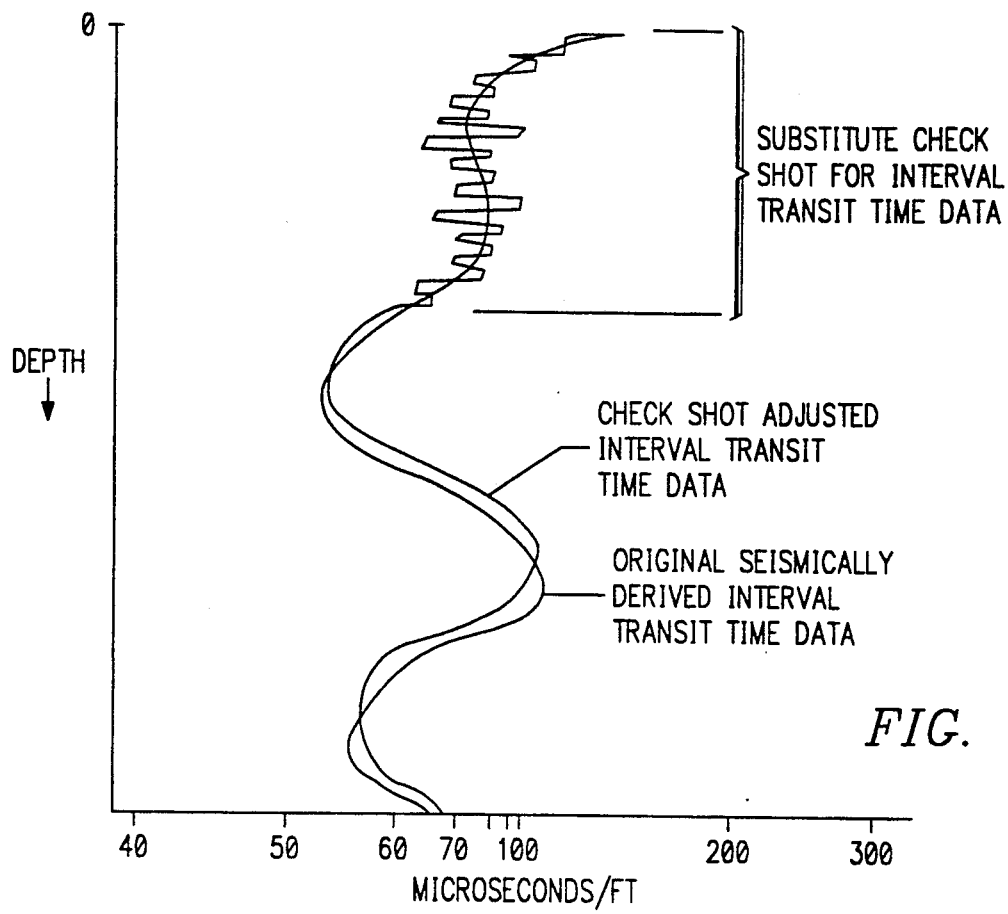
Figure 11C:
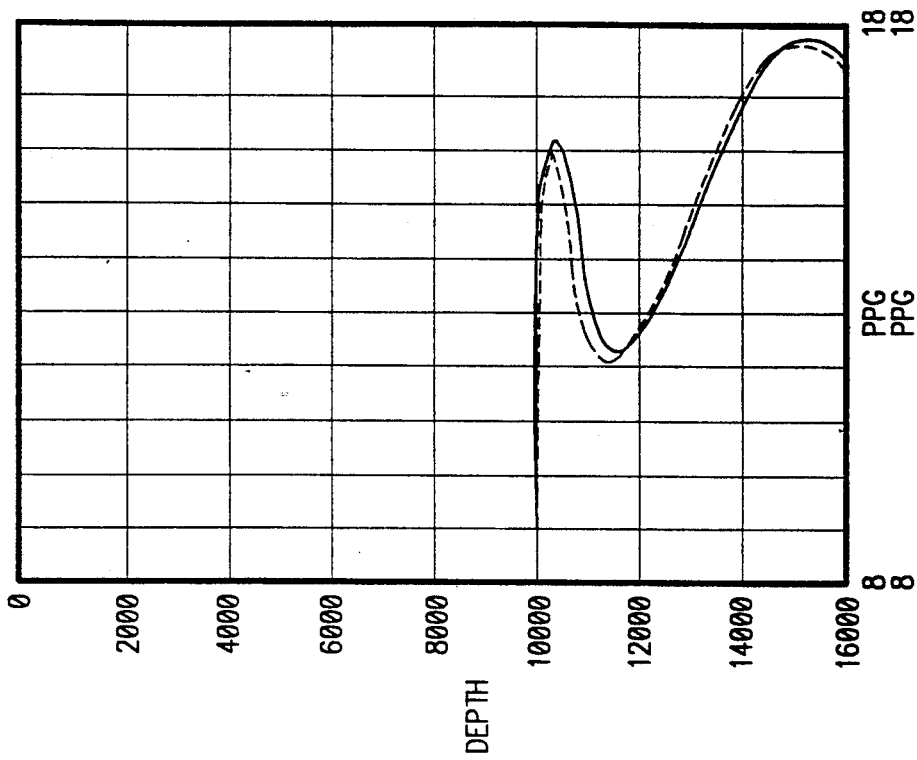

The primary applications of VSP are correlating time-to-depth, calibrating seismic interval velocity data, and integrating surface seismic with borehole data. When VSP data are used to calibrate interval velocities obtained from surface seismic data, predictions of depths and magnitudes of geopressure from surface seismic can be more accurate. Thus, in step (f) of the first preferred embodiment, computed interval transit times for already-drilled portions of the well are replaced using VSP- or check shot-corrected velocity; this typically changes total transit time to the already-drilled depth and thereby shifts computed interval transit times below already-drilled depth; see FIGS. 11a-b. Then step (g) of the first embodiment can be performed to obtain a check shot-corrected pressure gradient prediction. FIG. 11c shows an updated pressure predicted using the updated interval transit time.

The VSP receiver will also record waves from the surface source that have been reflected from structures beneath current well bottom; this amounts to a seismic survey below bottom of the well. In fact, the VSP receiver first records the direct downgoing wave from a surface source shot and then records upgoing reflections of this same wave from structures below well bottom, so reflected wave times and amplitudes are recorded along with direct arrival data. Then, using inversion methods (a single receiver implies no CMP), times and amplitudes can be converted to interval velocity data. Results are calibrated using VSP data from depths which overlap a zone of the well which has already been logged with a seismic tool.

Figure 12:
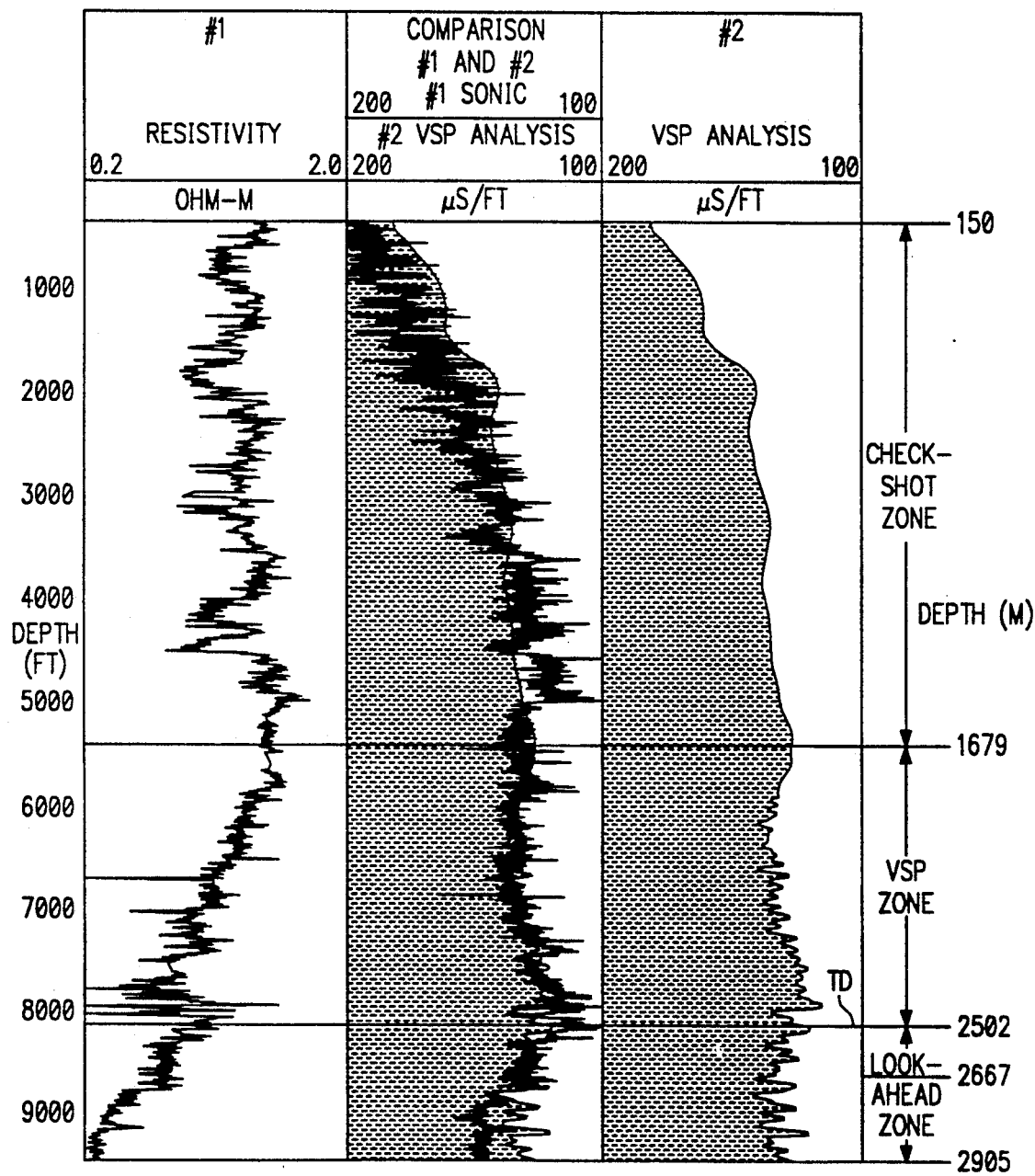
FIG. 12 illustrates a third preferred embodiment using VSP data.

This analysis is primarily valuable in identifying distance from well bottom down to potentially highly permeable sands located within geopressure. Large amplitude reflections can be identified and their depths predicted as much as 1000 feet ahead of drilling. FIG. 12 illustrates VSP prediction ahead of drilling: a VSP was recorded in a first well over the depth interval 5510 to 8210 feet; total depth (TD) of the first well was 8210 feet. Interval transit times derived from VSP data are shown in the right hand plot of FIG. 12. A second well was drilled to a depth of 9500 feet and laterally separated from the first well by 700 feet at a depth of 8500 feet. Interval transit times from VSP data in the first well are plotted on top of interval transit time data from a sonic log in the second well in the center of FIG. 10. Below 8210 feet there is a clear increase in transit time (decrease in velocity) which indicates geopressure. There is a lithology change at 8750 feet which can be identified from logs of the second well. There is also a large amplitude event in look-ahead VSP data at this depth from the first well. In comparing VSP data from the first well to sonic data of the second well, there are three zones of interest. First, there is a discrepancy in the 8000 to 8300 feet depth interval. The discrepancy over this interval is also present between sonic data from the second well and VSP data and is probably due to borehole effects in porous sands at this depth. As VSP velocity is slower than sonic velocity, the zone was probably invaded by drilling mud. Second, the depth interval from 8300 to 8750 feet shows good agreement between sonic and VSP. Third, there is a discrepancy in the 8750 to 9500 feet depth interval. This interval is below the lithology change at 8750 feet. The sonic shows a large increase in transit time (decrease in velocity) in this zone, which would indicate a significant increase in geopressure. Inverted VSP data does not show the correct magnitude of this increase in transit time. In summary, in predicting ahead of drilling, VSP data does show the event due to the lithology change and does show a velocity slowdown, which would indicate presence of geopressure. However, due to lack of low frequency information, the velocity trend indicated by VSP data would not give an accurate prediction of magnitude of geopressure.

When MWD (Measuring While Drilling) logs are used, the second embodiment steps can be performed to obtain estimation of pore pressure during drilling.

Figure 13A:
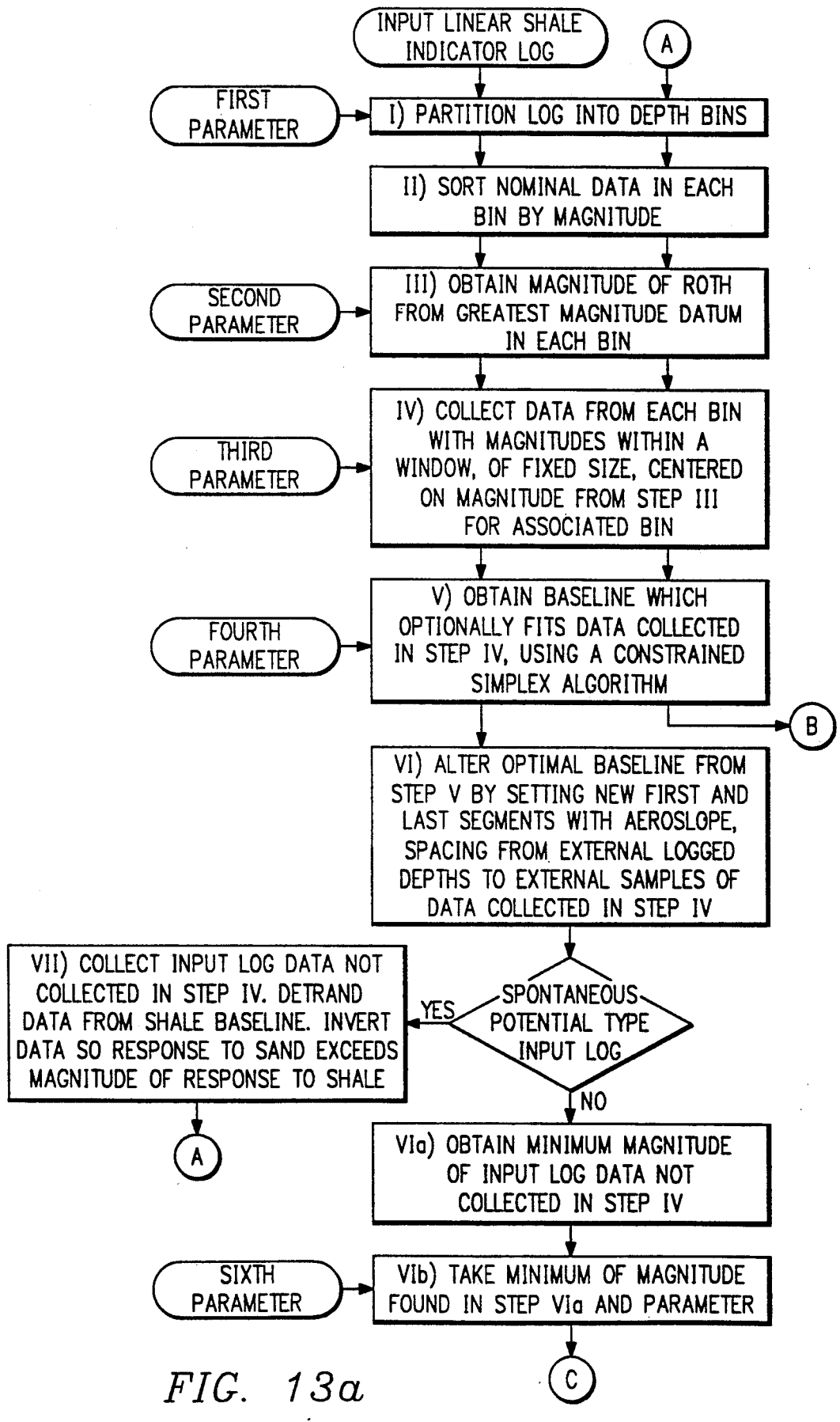
FIG. 13 is a flow chart for the shale fraction analysis.
Figure 13B:
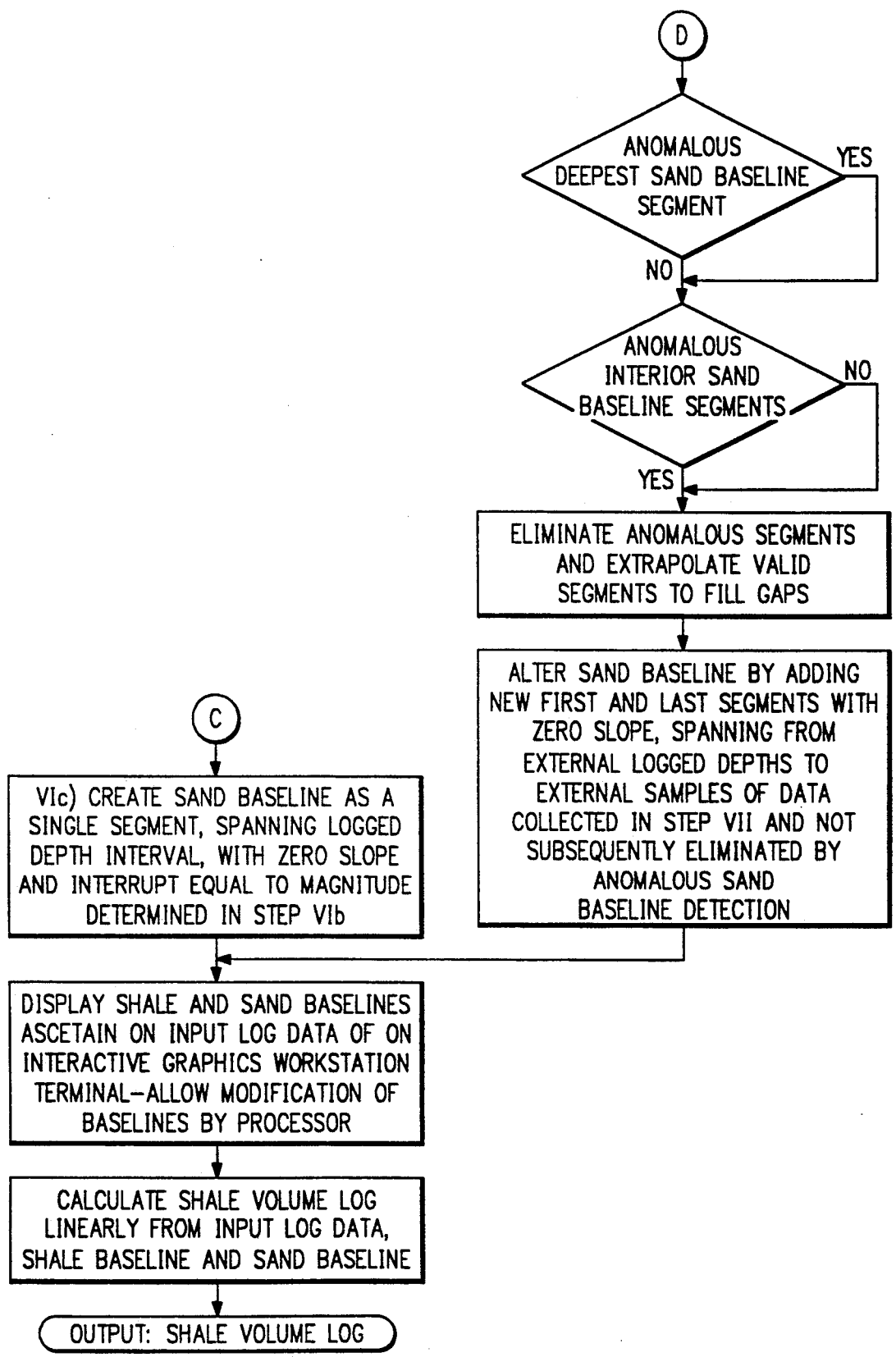
Figure 13C:
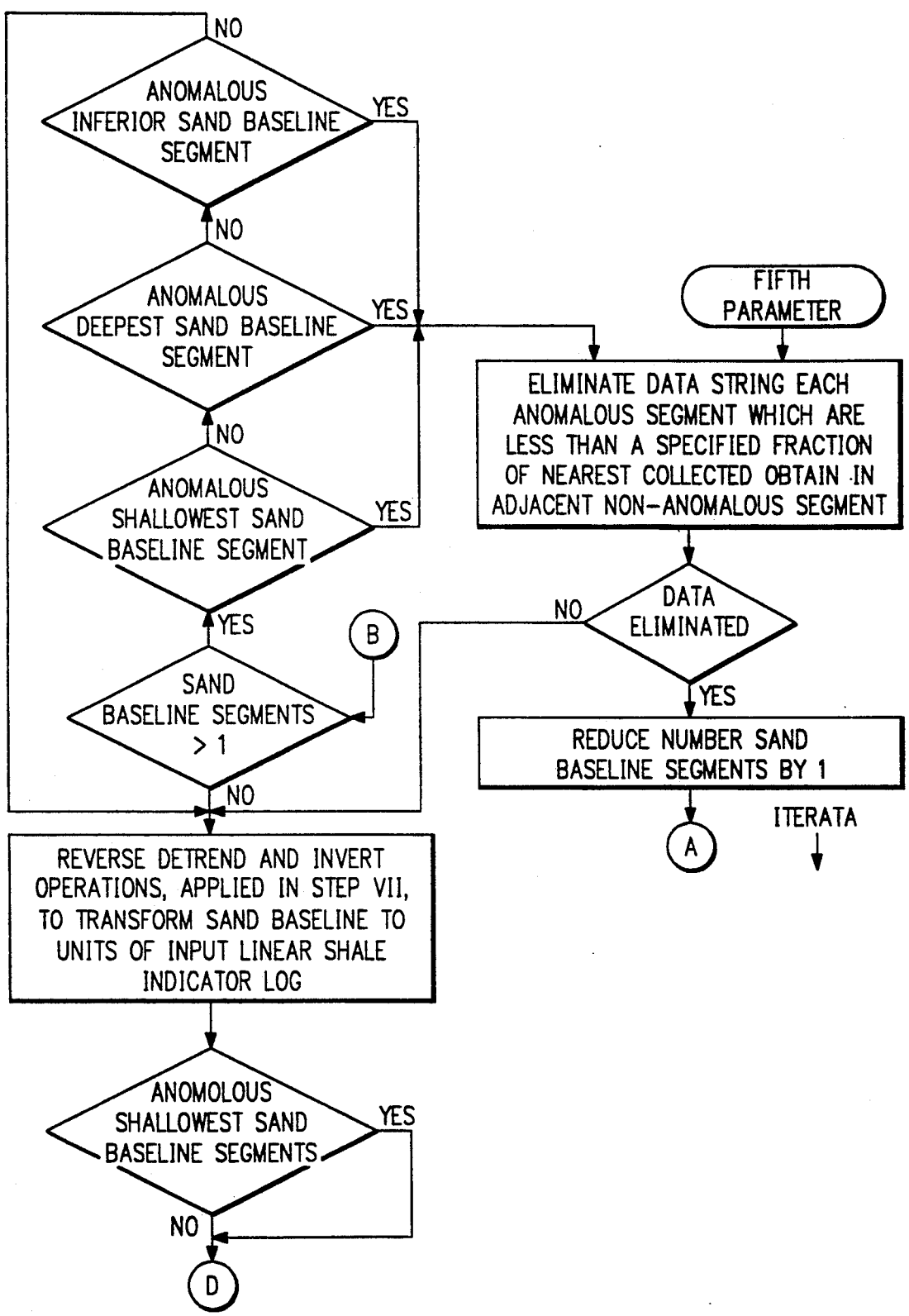

Method of Shale Fraction Estimation:

The flow chart of FIG. 13 shows the shale fraction method used in step (a) of the first preferred embodiment and which includes the following steps. It is assumed that a linear shale indicator log is supplied as input and that the input log is uniformly sampled in depth. Only shallowest logged depth, depth sampling increment and number of samples need specification for determining depth of acquisition of each linear shale indicator log datum. An input log datum is completely specified by its magnitude and sample index. Datum at shallowest measured depth is assigned sample index 0 and adjacent, deeper samples, have indices incremented by 1. It is further assumed that a linear shale indicator log datum magnitude less than or equal to $-999.0$ represents a nil datum, not processable.

Figure 14:
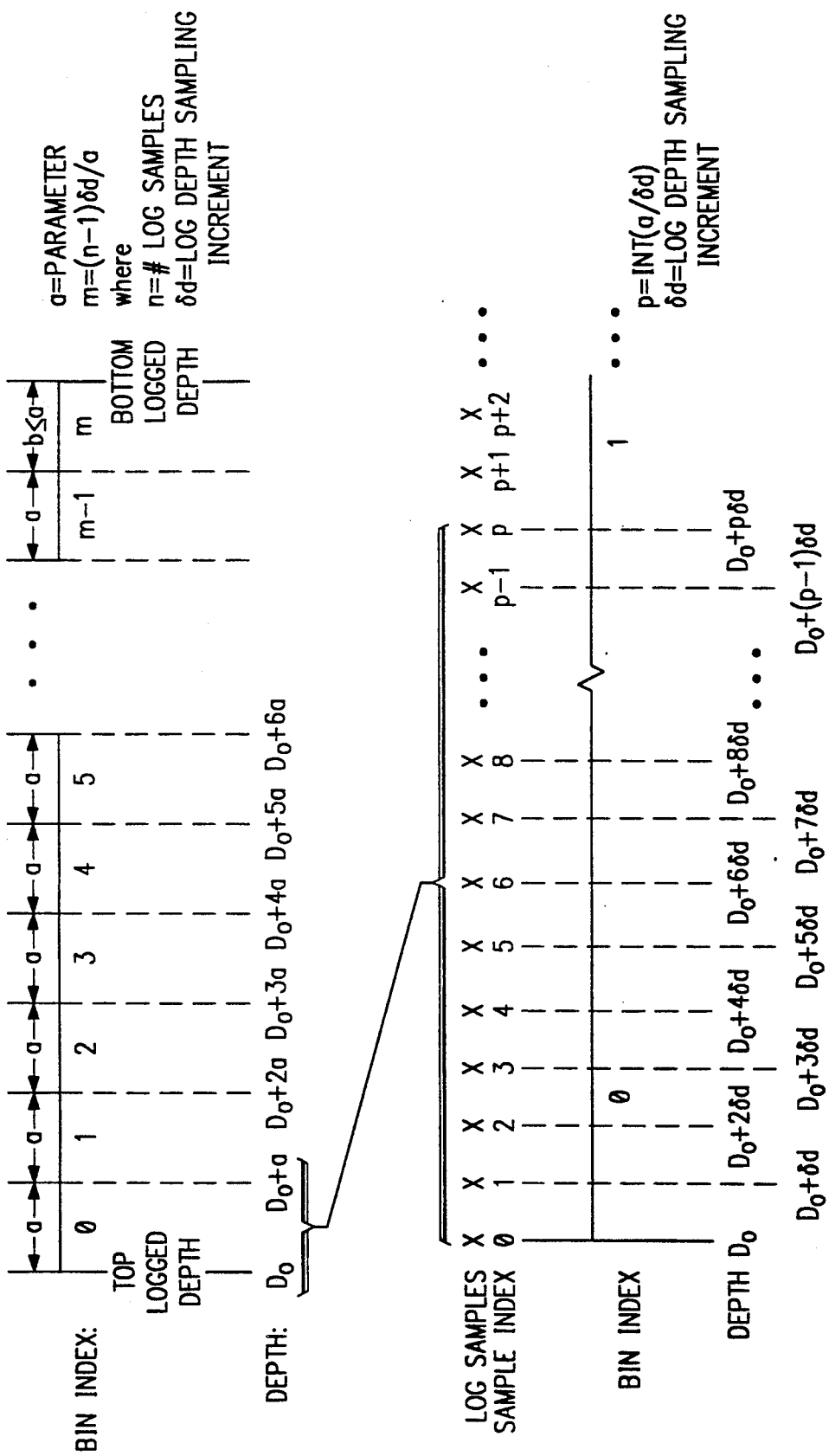
FIGS. 14-19 show steps in the shale fraction analysis.

(1) Partition input log by collected data into adjacent depth bins of equal size (FIG. 14). Size (i.e. depth range) of depth bin, $r_b$, is specified with a first parameter (feet per bin). Decrease size of deepest depth bin, if necessary, so that bin extends exactly to deepest logged depth.

(2) Separately sort (non-nil) data in each depth bin by magnitude.

(3) Separately determine n-th from greatest magnitude (non-nil) datum in each bin and denote this magnitude $M_j$, where j is index of depth bin (shallowest depth bin is assigned index 0 and deeper depth bins have indices incremented by 1). "n" is specified with a second parameter.

(4) Separately collect (non-nil) data in each bin with magnitudes in the range $[(M_j-r_m), (M_j+r_m)]$ by setting all data outside collection range to nil in a working copy of log. Acceptance range, $r_m$, is specified with a third parameter. Data so collected cluster about input log response to 100% of working constituent (either shale or sand).

Figure 15:
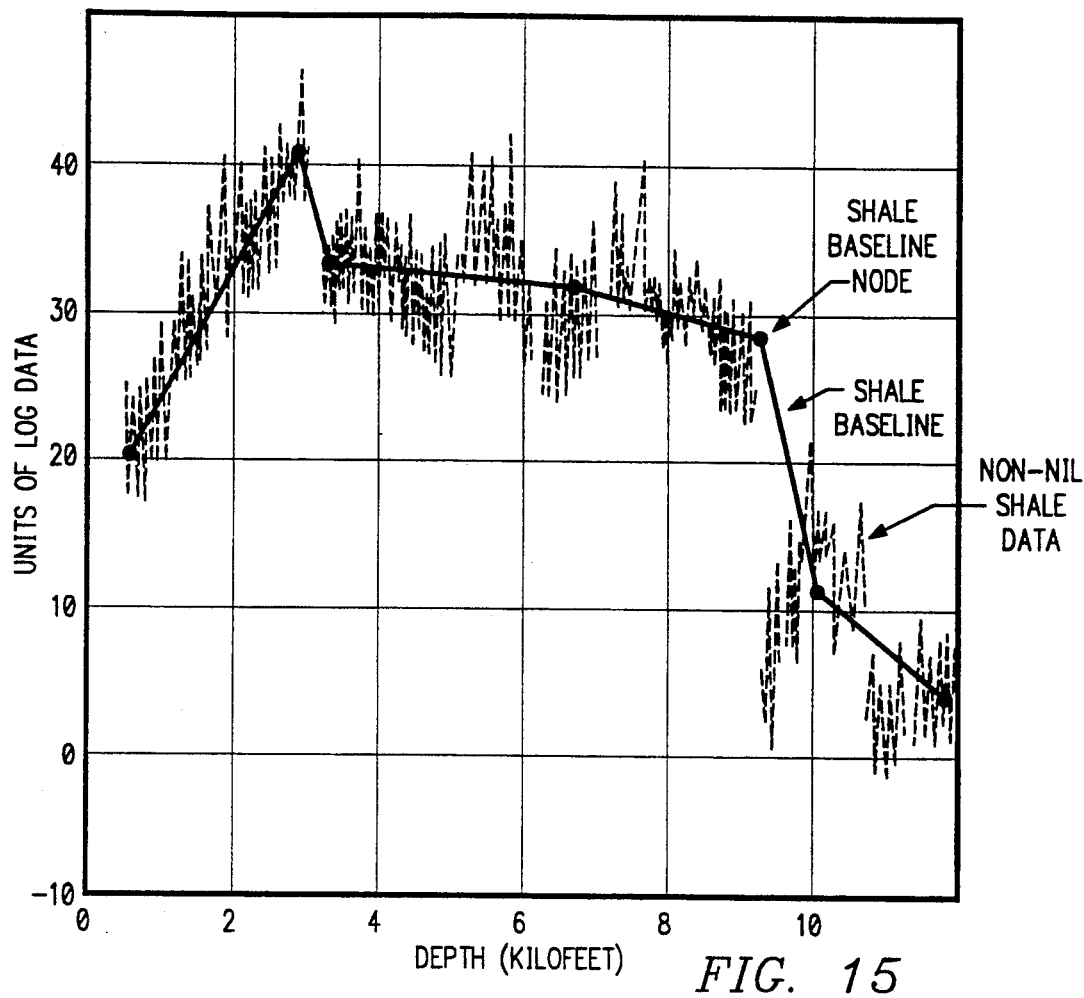

(5) Obtain piecewise linear best-fitting line through non-nil data in working copy of log, ignoring bins (FIG. 15). Line segments which are adjacent, in depth, share a common endpoint (a "node") in depth. The collection of line segments is called a "baseline". The number of line segments, $n_s$, is initially calculated from a fourth parameter which specifies nominal depth range per segment. $n_s$ is adjusted during iterative processing. Each line segment is specified by an intercept, a slope, a shallowest depth and a deepest depth.

The number of unknowns which must be determined for a baseline is $2n_s$, as adjacent segments share a common endpoint and because depth range spanned by baseline is fixed equal to input logged depth range. Unknowns are:

intercept of shallowest segment at shallowest logged depth;
slope of each segment;
length (depth range) of all but last segment.

To obtain an optimal baseline, use simplex method as follows:

a) generate $(2n_s+1)$ random guesses for baseline:
  i) randomly partition logged depth range into $n_s$ segments;
  ii) use least-squares methods to obtain slope and intercept of segment with largest collection of non-nil data;
  iii) using endpoints of segment determined in step ii, use least-squares methods to obtain slopes of adjacent segments. Continue with endpoints of new segments to obtain slopes of adjacent segments until baseline is completely specified.

b) input $(2n_s+1)$ random guesses into a constrained simplex algorithm to obtain an optimal (but not necessarily globally optimal) baseline. The constrained simplex algorithm is modified from a published algorithm, such as AMOEBA (Press, W. H., Flannery, B. P., Teukolsky, A. A. and Vetterling, W. T., 1986, Numerical Recipes, The Art of Scientific Computing, Cambridge University Press, Cambridge, U.K., p. 292-293) by:
  i) constrain segment lengths to be non-negative;
  ii) constrain sum of segment lengths to equal logged depth interval;
  iii) limit number of simplex algorithm iterations to a value specified by a fifth parameter;
  iv) for each iteration of simplex algorithm, determine working baseline error as sum of absolute values of differences between (non-nil) data and magnitude of working baseline at associated depth. As always for the simplex method, exit the simplex algorithm when error is less than a specified threshold. Error threshold is specified by a sixth parameter.

Figure 16:
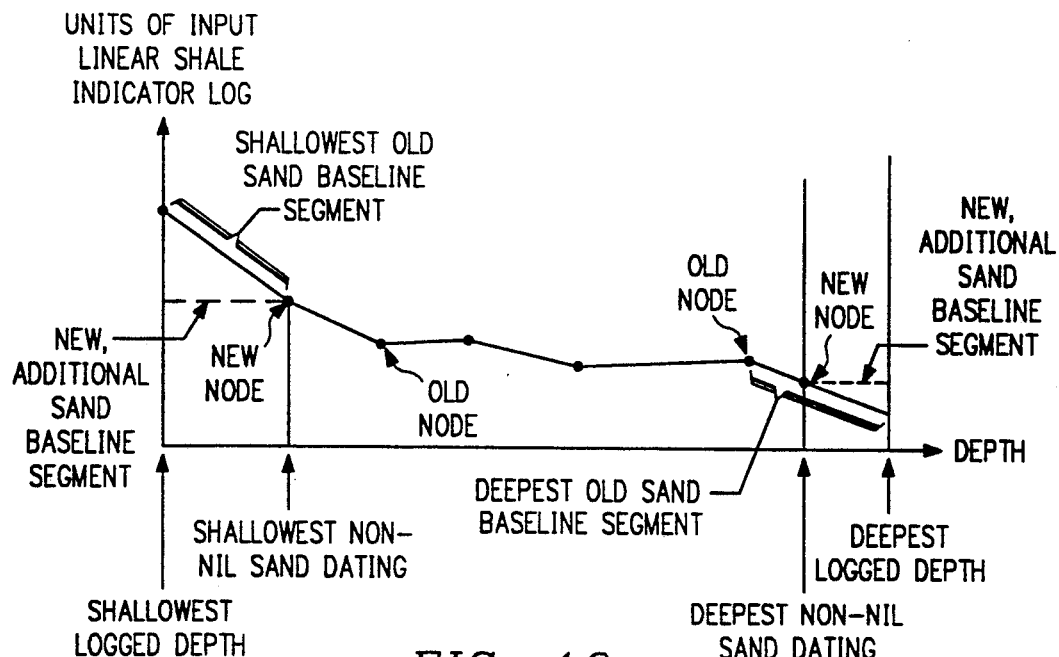

(6) Create two new zero-slope shale baseline segments which intercept first and last old shale baseline segments at first and last non-nil datum, respectively, (FIG. 16) and continue to shallowest and deepest logged depths, respectively. Adjust specification of old shallowest and deepest shale baseline segments accordingly, i.e. create two new shale baseline nodes and new first and last shale baseline segments.

a) If input linear shale indicator log does not tend to drift with depth and if input log response to 100% sand is invariant, as is often the case with Gamma Ray logs:
  i) Determine minimum magnitude among (non-nil) data in input log for which corresponding sample in working copy has nil magnitude.
  ii) Chose smaller of magnitude determined in step 6.a.i. and a value specified with a seventh parameter.
  iii) Establish 100% sand baseline as a single segment, spanning the logged depth interval, with intercept equal to magnitude determined in step 6.a.ii and slope of 0.0.
  iv) Proceed immediately to step 12.

(7) (Case of input linear shale indicator logs which tend to drift with depth, such as is often the case with Spontaneous Potential logs.) Collect "non-shale" data by converting non-nil magnitudes in working log to nil and converting nil magnitudes in working log to magnitudes of input linear shale indicator log. Detrend and invert "non-shale" log by replacing each datum with difference between datum and shale baseline magnitude at associated depth; effectively flattening log response to 100% sand. Magnitude of 100% sand then exceeds magnitude of 100% shale.

(8) Follow steps 1, 2, 3, 4 and 5 using new working log to obtain a working sand baseline. Parameter magnitudes may be changed for sand baseline picking.

Figure 17:
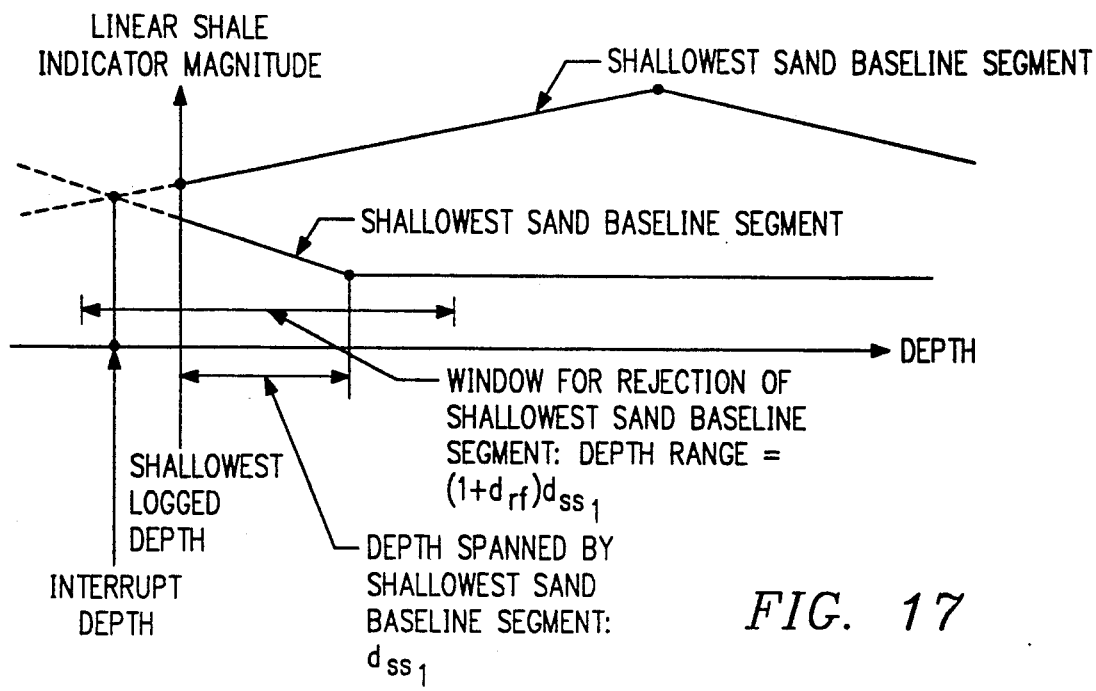
Figure 18:
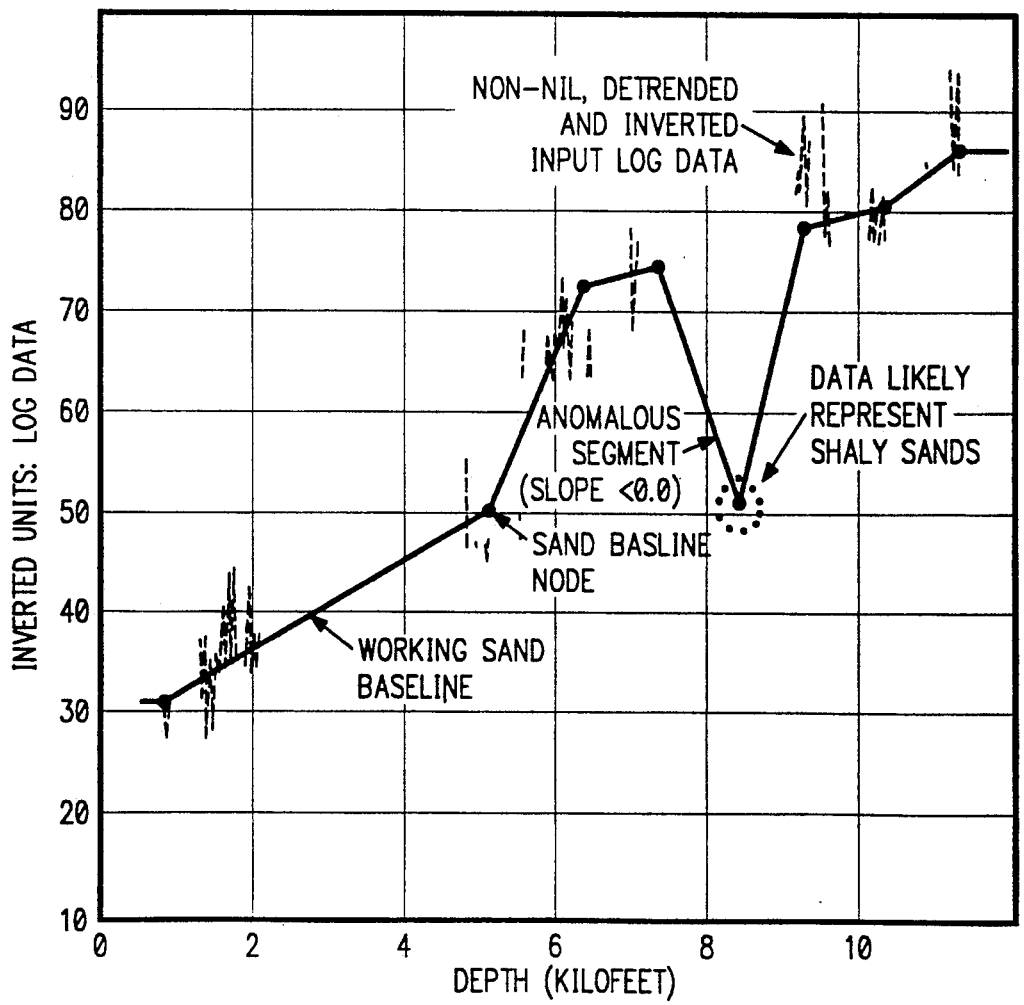

(9) Apply tests for presence of anomalous sand baseline segments if number of sand baseline segments ($N_s$) exceeds ones. If anomalous segments are found, iteration will occur as described later.
a) Determine intercept of shallowest sand baseline segment and shallowest shale baseline segment (accounting for prior detrend and invert operations on sand data applied in step 7)—see FIG. 17. If intercept is within a depth range, centered on depths spanned by shallowest sand baseline segment, equal to $(1+d_{rf})$ times depth range spanned by shallowest baseline segment, then shallowest sand baseline segment is denoted as anomalous. Proceed immediately to step 9d. $d_{rf}$ is an eighth non-negative parameter.
b) Determine intercept of deepest sand baseline segment and deepest shale baseline segment (accounting for prior detrend and invert operations on sand data applied in step 7) analogous to step 9a. If intercept is within a depth range, centered on depths spanned by deepest baseline segment, then deepest baseline segment is denoted as anomalous. Proceed immediately to step 9d.
c) Test for anomalous interior (i.e. between shallowest and deepest) sand baseline segments, beginning with shallowest sand baseline segment:
  i) Find next (including current) segment with negative slope; e.g., FIG. 18. If no such segment found, then proceed immediately to step 10—sand baseline is acceptable.
  ii) Denote current segment as anomalous and find all adjacent segments with negative slope and denote these also as anomalous.
d) For each anomalous sand baseline segment denoted,
  i) find nearest (non-nil) sand datum spanned by next deepest sand baseline segment which is not denoted as anomalous, saving magnitude as $M_{rf}$. If no such deeper segment found, search among closest shallower segments. If all segments are anomalous, proceed immediately to step 10—sand baseline must be determined manually.
  ii) Among (non-nil) data spanned by working anomalous sand baseline segment, set magnitude of datum to nil if datum magnitude is less than $r_{fs}$ times $M_{rf}$, where $r_{fs}$ is a ninth parameter.
e) If at least one datum was set to nil in step 9.d.ii, then
  i) decrement number of sand baseline segments ($n_s$) by one;
  ii) proceed immediately to step 8—iterate.

(10) Convert sand baseline to units of input linear shale indicator log by reversing detrend and invert steps applied previously in step 7. Note that this operation introduces new segments and nodes to the sand baseline. Repeat steps 9a, 9b and 9c to test for anomalous sand baseline segments after conversion is completed. Eliminate any identified anomalous segments and extrapolate remaining segments to fill gaps.

(11) Create two new zero-slope sand baseline segments which intercept first, and last old sand baseline segments at first and last non-nil datum, respectively (FIG. 16) and continue to shallowest and deepest logged depths, respectively. Adjust specification of old shallowest and deepest baseline segments accordingly, i.e. create two new sand baseline nodes and new first and last sand baseline segments.

Figure 19:
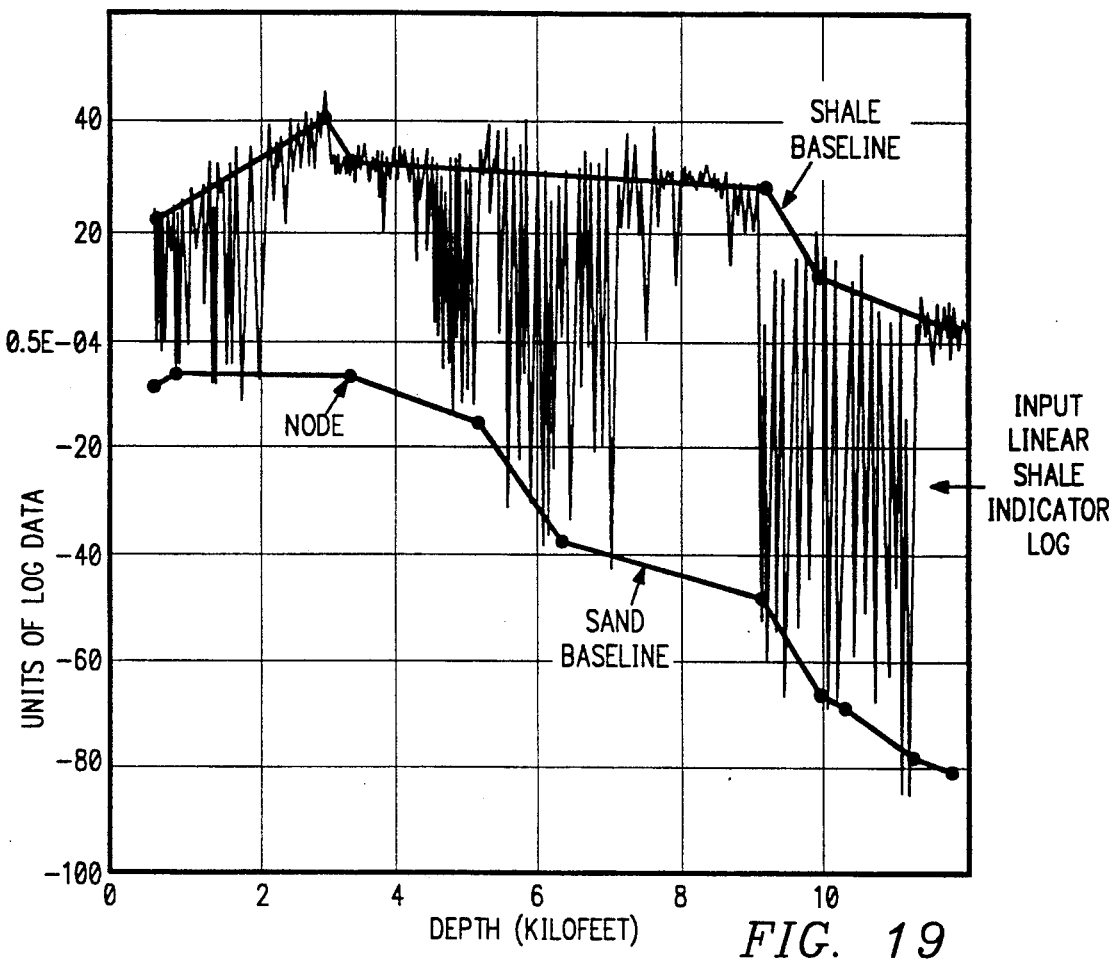

(12) Graphically display shale and sand baseline, overlain on input linear shale indicator log data, as indicated in FIG. 19. Permit interactive editing of baseline nodes by processor using a graphics computer work station with mouse. Editing functionality needs to include:
functional specification a)
Modify location of a node by mouse click-and-drag functionality. Associated baseline segment specifications changed in real time during dragging and altered results presented graphically in real time.
functional specification b)
Delete node with mouse click functionality. Associated baseline segments altered accordingly and graphical representation updated immediately.
functional specification c)
Create new node with mouse click functionality. New node initially created along existing baseline segment. New node can then be modified using feature 12a.
functional specification d)
Undo last operation of type 12a, 12b or 12c.
functional specification e)
Accept (modified) baseline and continue processing.

(13) Calculate shale volume log from input linear shale indicator log and baselines for sand and shale. At each sampled depth, j, if $L_j$ represents magnitude of input log data, $SH_j$ represents magnitude of shale baseline and $SS_j$ represents magnitude of sand baseline, then shale volume, $V_{sh}$, is determined as $$V_{sh} = 100(L_j - SS_j)/(SH_j - SS_j).$$

The shale fraction method embodies a set of expert rules which can be optimized by adjusting a set of parameters. Parameters are established and then fixed for wells throughout a field, region or basin under study. Embodied rules are:
Rule 1
Rock composition in the majority of the logged section of a well is 100% shale.
Rule 2

Shale and sand baselines each vary in piecewise linear fashion with depth. For shale, there exists a parameter which represents a maximal depth range (e.g. 300 feet) within which linear shale indicator log response to 100% shale volume varies linearly with depth in wells throughout a field, region or basin. For sand, there exists a parameter which represents a maximal depth range (e.g. 1,000 feet) within which linear shale indicator log response to 100% sand is invariant (excepting long period drift in overall log response with depth, such as can occur with Spontaneous Potential logs) in wells throughout a field, region or basin. Linear shale indictor logs can, accordingly, be partitioned by depth into bins within which response to 100% shale volume varies linearly with depth. Bin size is large compared to sampling of linear shale indicator log.

Rule 3

In any depth bin, if linear shale indictor log data is sorted by magnitude, the n-th from greatest magnitude datum is 100% shale, where n can be held constant throughout a field, region or basin. Similarly, in any depth bin, if linear shale indicator log data is sorted by magnitude, the n-th from least magnitude datum is 100% sand, where n can be held constant throughout a field, region or basin.

Rule 4

The maximum number of line segments required to represent piecewise linear response of a linear shale indicator log to 100% shale or 100% sand is linearly proportional to the logged depth interval throughout a field, region or basin.

Rule 5

100% sand is present within the logged depth interval and is distributed such that shaly sand (e.g. rock composed of 60% sand and 40% shale), if also present, can be readily discriminated based on presence of adjacent 100% sand and 100% shale intervals.

Rule 6

Linear shale indicator response to 100% sand usually varies monotonically with depth. The "sand baseline", representing linear shale indicator log piecewise linear response to 100% sand throughout the logged depth interval, never intercepts the "shale baseline", the latter representing linear shale indicator log piecewise linear response to 100% shale throughout the logged depth interval.

In a second embodiment method, a rock property log which can be manually obtained by picking a single baseline through the entirety of an input well log is automatically obtained by following steps 1 through 6 in the first embodiment, omitting step 6a and subsequent steps. Apply second embodiment to estimate bound water electrical resistivity versus depth from an "apparent" bound water electrical resistivity log. "Apparent" logs are traditionally obtained through processing of standard logs according to a specified model (i.e. dual-water model in case of bound water electrical resistivity) but neglecting some model features. For creation of an "apparent" bound water electrical resistivity log:

(1) First obtain a shale volume log following first embodiment.

(2) Obtain a neutron-density crossplot porosity log (3) Assume water saturation, $S_w$, of pore space is 1.0 (100% water saturated) throughout logged interval and solve Archie's equation $$S_w{}^n = a r_{wb} / \phi^m R_T,$$

where:

a,m,n, are Archie's parameters;

$\phi$ is porosity (pore volume fraction of a unit rock volume);

$R_T$ is measured formation electrical resistivity (mmho)— for an apparent bound water electrical resistivity ($r_{wb}$ in mmho) log, given specification of Archie's parameters {a,m,n} and assuming that $S_w = 1.0$ at all depths.

(4) Using shale volume log obtained in step 1, set each apparent bound water electrical resistivity log datum to nil if shale volume is less than T, where T is a parameter supplied by processor.

(5) Input log obtained in step 4 to the first preferred embodiment and proceed through step 6; ending before step 6a.

Further Modifications and Variations:

When a velocity analyses is preformed on seismic data, the shallower portion of the analysis may be inaccurate. This affects derived interval transit time versus depth data, and results in inaccuracies in depth values that are derived from time-to-depth conversion.

Figure 11B:
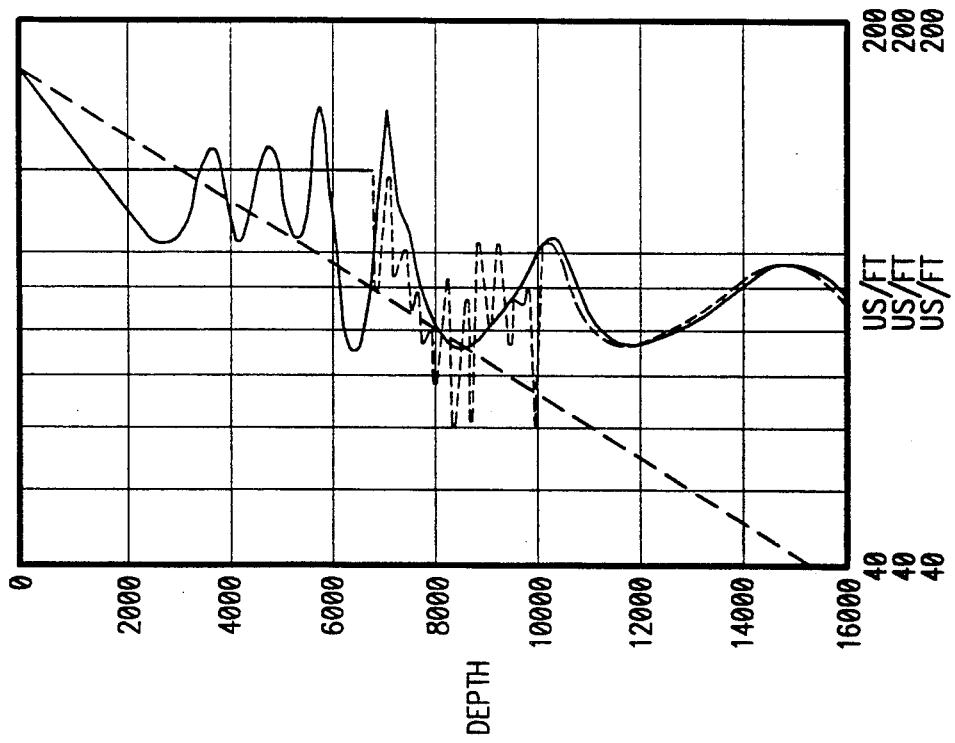

Adjustments can be made to interval transit time data while a well is being drilled, improving predicted pressure data ahead of the drilling bit. This is accomplished by using Check Shot data, and substituting it for the shallower portion of interval transit time data (versus time) and then recomputing, with a time-to-depth conversion, adjusted interval transit time versus depth data. The correction results in a depth offset when compared with original interval transit time data (FIGS. 11a-c).

This adjustment can be applied to an entire seismic section to improve pressure predictions in deviated wells.

Figure 20:
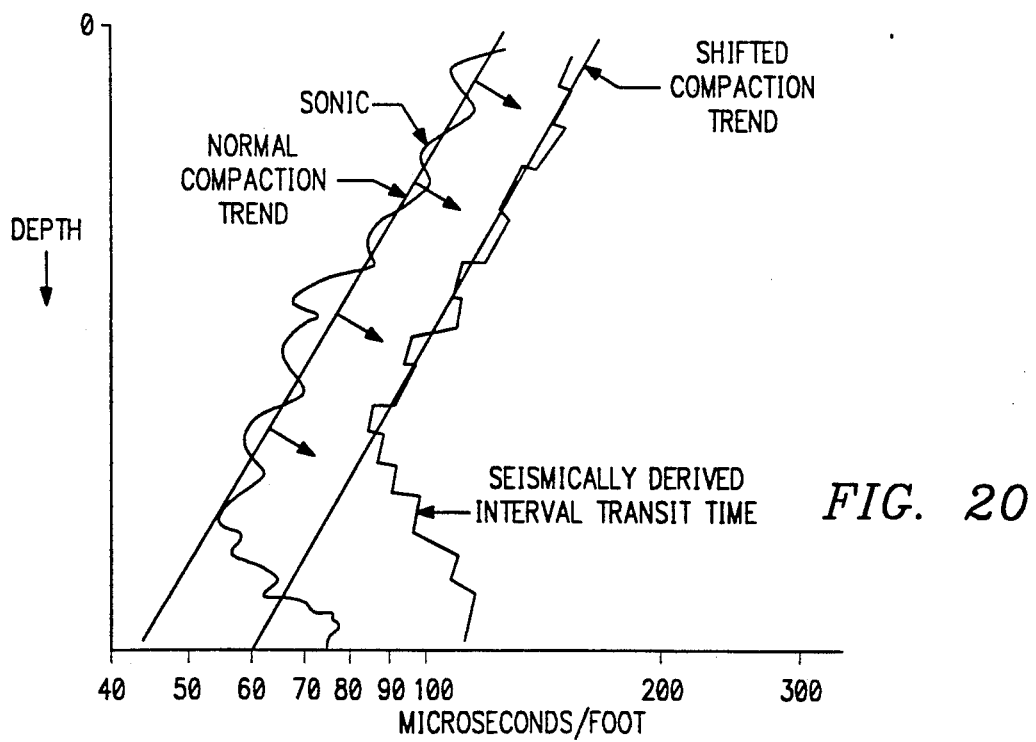
FIG. 20 shows a shifted compaction trend.

To convert seismically derived interval transit time data (ITT) into pressure, data must first be normalized to a normal compaction trend line. This normal compaction trend line is derived from wireline log data acquired in a "control" well near the seismic line. It is assumed that this trend can be applied to all data along the seismic line. The normal compaction trend line slope and intercept are described in terms of the logarithm of sonic interval transit time data. Occasionally, there is a level shift between sonic log data and ITT data. We correct for this offset by shifting the normal compaction trend line to better fit ITT data; maintaining the slope, while shifting the zero depth intercept (FIG. 20). This shifted compaction trend line is then applied to all CMP's on the seismic line. At this point, they are normalized to deviation values from this shifted normal compaction trend line. Translation trend(s) may then be applied to convert this data into pressure data.

Figure 21:
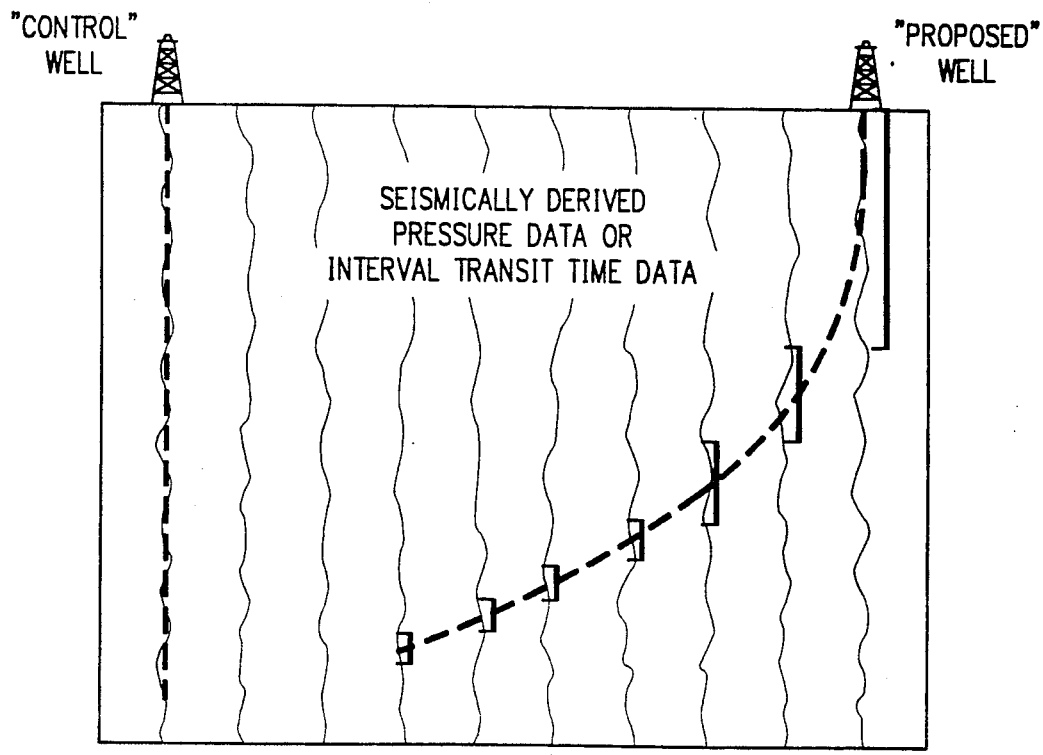
FIG. 21 illustrates pressure vs. measured depth and true vertical depth.

The purpose of deriving pressure data from seismic data is to give more control on pressure variations in the immediate vicinity of a "proposed" well location. To get more quantitative data for the case of a non-vertical or deviated proposed well, pressure data can be extracted along the projected borehole path (in a measure depth sense) or can be adjusted to true vertical. Non-overlapping segments of seismically derived data are extracted along the proposed wall path and these are pieced together; see FIG. 21. Offsets at junctions of these segments can be smoothed by data filtering. These techniques require that the proposed well path be projected onto the seismic cross section if it does not lie on it directly.

Figure 22:
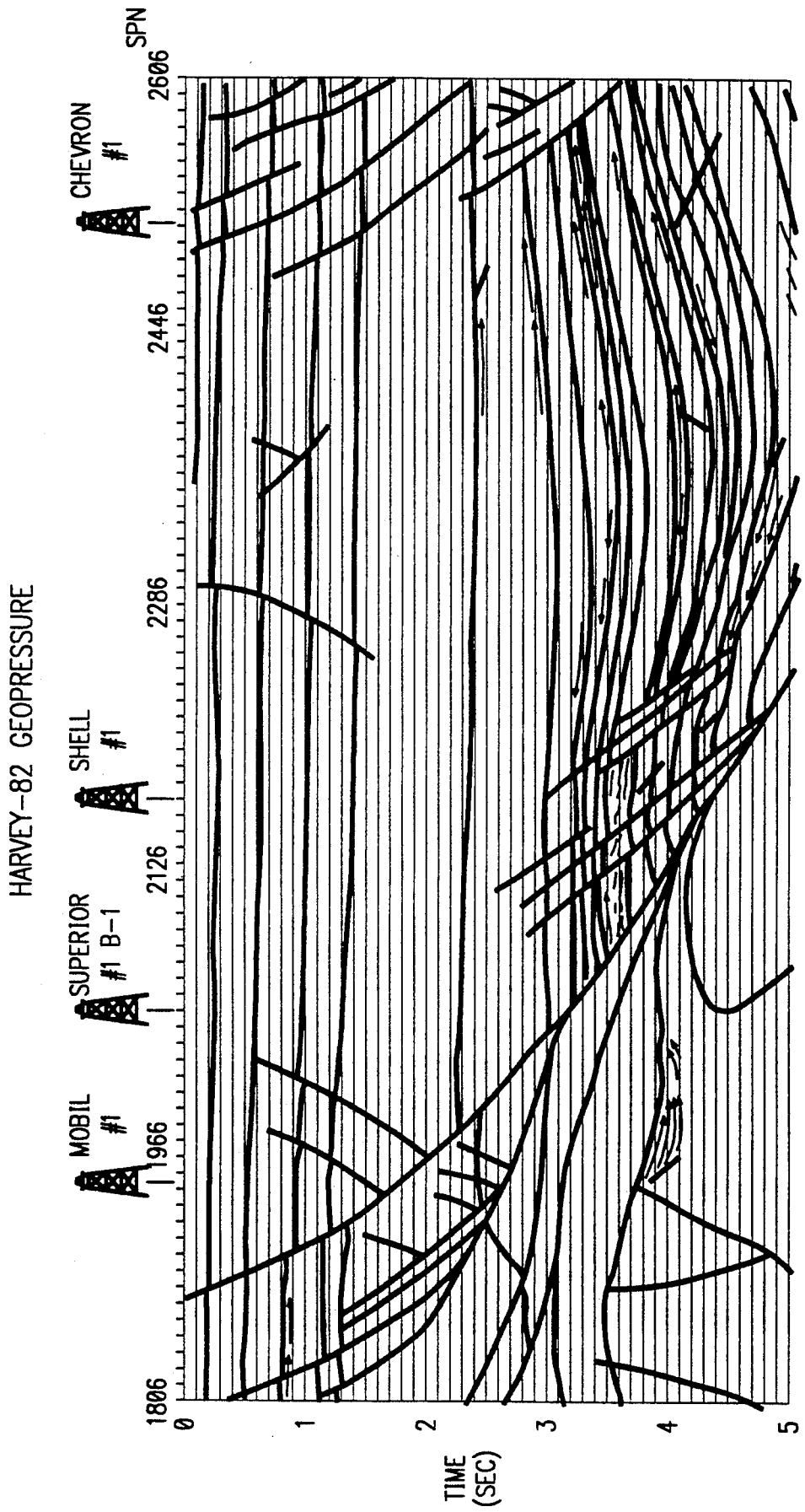
FIG. 22 shows a geopressure cross section overlain with a geological structure interpretation.

The two dimensional cross section of geopressure can be used to enhance seismic interpretation. For example: (1) the geopressure cross section are integrated with a geologic structure interpretation (see FIG. 22), geopressure can be inferred to identify sealing versus leakage aspects of individual faults in the studied area; (2) the pressure cross section indicate appearance of sand in the geopressure environment.

With the procedure described in the second embodiment, geologists can perform multiple-well compaction and geopressure analyses to develop a top-depth-of-geopressure map for regional study.

What is claimed is:

1. A method of estimating shale fraction, comprising the steps of:
   (a) partitioning shale indicator log data into depth bins;
   (b) for each bin collecting all data within a first range (both greater than and less than) of the nth largest;
   (c) piecewise linearly fitting a shale baseline to an aggregate of all of said data collected in step (b);
   (d) for each bin inverting with respect to said shale baseline all data not collected in step (b);
   (e) for each bin collecting all inverted data within a second range (both greater than and less than) of the mth largest;
   (f) piecewise linearly fitting a sand baseline to an aggregate of all of said data collected in step (e); and
   (g) scaling said shale indicator log data between said shale and sand baselines.

2. The method of claim 1, wherein:
   (a) when said shale indicator log data is characterized by invariant magnitude for 100% sand, replace steps (d)–(f) with a constant sand baseline determined by the smallest datum of said shale indicator log data.

3. The method of claim 1, wherein:
   (a) said shale indicator log data is uniformly sampled with respect to depth;
   (b) said bins correspond to substantially equal depth intervals and the size may be adjusted for iteration of steps (a)–(g);
   (c) said n to set the nth largest may be adjusted for iteration of steps (b)–(g);
   (d) said first range may be adjusted for iteration of steps (b)–(g); and
   (e) said piecewise linearly fitting is done by constrained simplex processing.

4. The method of claim 1, further comprising the steps if:
   (a) testing for decreases in said sand baseline from step (f) of claim 1 as depth increases; and
   (b) when said sand baseline decreases, adjusting said sand baseline by iteration.

5. A method of estimating shale fraction as a function of depth from a linear shale indicator log, comprising the steps of:
   (a) providing a first length parameter, $r_B$;
   (b) partitioning shale indicator log data into depth bins of depth equal to $r_B$;
   (c) providing a first integral magnitude order parameter, n;
   (d) providing a first magnitude range parameter, $r_N$;
   (e) for each bin, sorting said data by magnitude and determining the $n^{th}$ largest;
   (f) for each bin, collecting all data with magnitude differing from that of said $n^{th}$ largest by at most $r_N$;
   (g) piecewise linearly fitting a shale baseline to an aggregate of all of said data collected in step (f);
   (h) for each bin, inverting with respect to said shale baseline all data not collected in step (f);
   (i) providing a second integral magnitude order parameter, m;
   (j) providing a second magnitude range parameter, $r_M$
   (k) for each bin, determining the $m^{th}$ largest of all said inverted data;
   (l) for each bin, collecting all of said inverted data with a magnitude differing from that of said $m^{th}$ largest by at most $r_M$;
   (m) piecewise linearly fitting a sand baseline to an aggregate of all of said data collected in step (1); and
   (n) scaling said data between said shale and sand baselines.

6. The method of claim 5, wherein:
   (a) said shale indicator log data is uniformly sampled with respect to depth;
   (b) $r_B$ may be adjusted for iteration of steps (a)–(n);
   (c) n and m may be adjusted for iteration of steps (c)–(n);
   (d) $r_N$ and $r_M$ may be adjusted for iteration of steps (c)–(n); and
   (e) said piecewise linearly fitting in either step (g) or step (m) or both is done by constrained simplex processing.

7. A method of forming a rock property log from an input well log, comprising the steps of:
   (a) providing a first length parameter, $r_C$;
   (c) providing a first integral magnitude parameter, k;
   (d) providing a first magnitude range parameter, $r_K$;
   (e) for each bin, sorting said data by magnitude and determining the $k^{th}$ largest;
   (f) for each bin, collecting all data with magnitude differing from that of said $k^{th}$ largest by at most $r_K$; and
   (g) piecewise linearly fitting a baseline to an aggregate of all of said data collected in step (f).

8. The method of claim 7, wherein:
   (a) said input well log data is an "apparent" log.

9. The method of claim 8, wherein:
   (a) said "apparent" log is an "apparent" bound water resistivity log.

10. The method of claim 9, wherein:
    (a) said "apparent" bound water resistivity log derives from a method comprising the steps of:
       (1) partitioning shale indicator log data into depth bins;
       (2) for each bin collecting all data within a first range (both greater than and less than) of the nth largest;
       (3) piecewise linearly fitting a shale baseline to an aggregate of all of said data collected in step (2);
       (4) for each bin inverting with respect to said shale baseline all data not collected in step (2);
       (5) for each bin collecting all inverted data within a second range (both greater than and less than) of the mth largest;
       (6) piecewise linearly fitting a sand baseline to an aggregate of all of said data collected in step (5);
       (7) scaling said shale indicator log data between said shale and sand baselines;
       (8) providing a porosity log;
       (9) computing an apparent bound water resistivity $r_{WB}$ from Archie's equation with an assumption of a water saturation of 100% and with an input measured formation electrical resistivity log; and
       (10) using the scaled shale indicator log data from step (7) to make nil each $r_{WB}$ datum from step (9) when the scaled shale indicator at the same depth is less than a predetermined parameter.

* * * * *